(12) United States Patent
Komura et al.

(10) Patent No.: US 11,532,822 B2
(45) Date of Patent: Dec. 20, 2022

(54) FIBROUS CARBON, METHOD FOR MANUFACTURING SAME, ELECTRODE MIXTURE LAYER FOR NON-AQUEOUS-ELECTROLYTE SECONDARY CELL, ELECTRODE FOR NON-AQUEOUS-ELECTROLYTE SECONDARY CELL, AND NON-AQUEOUS-ELECTROLYTE SECONDARY CELL

(71) Applicant: TEIJIN LIMITED, Osaka (JP)

(72) Inventors: Shinya Komura, Osaka (JP); Ryota Hirakawa, Osaka (JP); Kazuki Yachi, Osaka (JP); Asami Kanematsu, Osaka (JP); Takahiro Daido, Osaka (JP)

(73) Assignee: TEIJIN LIMITED, Osaka (JP)

( * ) Notice: Subject to any disclaimer, the term of this patent is extended or adjusted under 35 U.S.C. 154(b) by 0 days.

(21) Appl. No.: 15/736,434

(22) PCT Filed: Jun. 16, 2016

(86) PCT No.: PCT/JP2016/067964
§ 371 (c)(1),
(2) Date: Dec. 14, 2017

(87) PCT Pub. No.: WO2016/204240
PCT Pub. Date: Dec. 22, 2016

(65) Prior Publication Data
US 2018/0175391 A1    Jun. 21, 2018

(30) Foreign Application Priority Data

Jun. 18, 2015 (JP) .............................. JP2015-122998
Jun. 18, 2015 (JP) .............................. JP2015-123000
Jan. 22, 2016 (JP) .............................. JP2016-011002

(51) Int. Cl.
*H01M 4/66* (2006.01)
*H01M 4/13* (2010.01)
(Continued)

(52) U.S. Cl.
CPC ............. *H01M 4/663* (2013.01); *C01B 32/05* (2017.08); *D01F 9/12* (2013.01); *D01F 9/14* (2013.01);
(Continued)

(58) Field of Classification Search
CPC ..................................................... H01M 4/663
See application file for complete search history.

(56) References Cited

U.S. PATENT DOCUMENTS

| 5,612,155 A * | 3/1997 | Takami | ................ | H01M 4/133 |
| | | | | 429/233 |
| 2003/0099883 A1* | 5/2003 | Ochoa | ................... | H01M 4/131 |
| | | | | 429/223 |

(Continued)

FOREIGN PATENT DOCUMENTS

| CN | 1883068 A | 12/2006 |
| CN | 101165946 A | 4/2008 |

(Continued)

OTHER PUBLICATIONS

Definitions (Year: 2019).*
(Continued)

*Primary Examiner* — Brian R Ohara
(74) *Attorney, Agent, or Firm* — Sughrue Mion, PLLC

(57) ABSTRACT

The present invention provides: a fibrous carbon characterized in that the average effective fiber length is 1-100 μm, and the crystallite length (La) measured using X-ray diffraction is 100-500 nm; an electrode mixture layer for a non-aqueous-electrolyte secondary cell, said mixture comprising an electrode active material and a carbon-based
(Continued)

electroconductive auxiliary agent containing said fibrous carbon; an electrode for a non-aqueous-electrolyte secondary cell, the electrode comprising a collector and said electrode mixture layer for a non-aqueous-electrolyte secondary cell, the electrode mixture layer being laminated on the collector; and a non-aqueous-electrolyte secondary cell having said electrode for a non-aqueous-electrolyte secondary cell.

12 Claims, 9 Drawing Sheets

(51) Int. Cl.
*H01M 4/62* (2006.01)
*H01M 10/0525* (2010.01)
*C01B 32/05* (2017.01)
*D01F 9/12* (2006.01)
*D01F 9/14* (2006.01)

(52) U.S. Cl.
CPC .............. *H01M 4/13* (2013.01); *H01M 4/62* (2013.01); *H01M 10/0525* (2013.01)

(56) References Cited

U.S. PATENT DOCUMENTS

| | | | | |
|---|---|---|---|---|
| 2005/0221170 | A1* | 10/2005 | Takeuchi | H01M 4/131 429/122 |
| 2006/0188784 | A1* | 8/2006 | Sudoh | H01M 10/0525 429/232 |
| 2007/0092428 | A1 | 4/2007 | Sotowa et al. | |
| 2008/0096098 | A1 | 4/2008 | Shirakata et al. | |
| 2008/0193845 | A1* | 8/2008 | Muraoka | H01M 2/16 429/223 |
| 2011/0033705 | A1* | 2/2011 | Komura | D01F 6/44 428/401 |
| 2013/0295439 | A1* | 11/2013 | Masarapu | H01M 10/0525 429/188 |

FOREIGN PATENT DOCUMENTS

| | | |
|---|---|---|
| JP | 59-168124 A | 9/1984 |
| JP | 10-134814 A | 5/1998 |
| JP | 3031197 B2 | 4/2000 |
| JP | 2000-319664 A | 11/2000 |
| JP | 2003-077473 A | 3/2003 |
| JP | 2005-060882 A | 3/2005 |
| JP | 2005-097792 A | 4/2005 |
| JP | 2005-248371 A | 9/2005 |
| JP | 2010-111979 A | 5/2010 |
| JP | 2016-033278 A | 3/2016 |
| JP | 2016-033279 A | 3/2016 |
| TW | 201042105 A1 | 12/2010 |
| WO | 2009/125857 A | 10/2009 |
| WO | 2010/090343 A1 | 8/2010 |

OTHER PUBLICATIONS

Rahul Shara, Determination of defect density, crystallite size and No. of graphene layers in graphene analogues using X-ray diffraction and Raman spectroscopy (Year: 2017).*

International Search Report for PCT/JP2016/067964 dated Sep. 20, 2016.

* cited by examiner

[Fig.1]
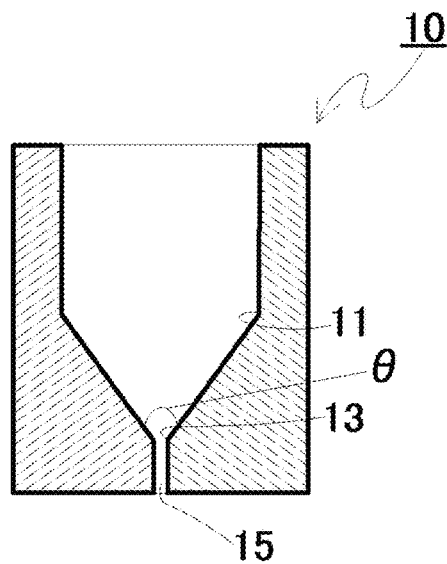
[Fig.2]
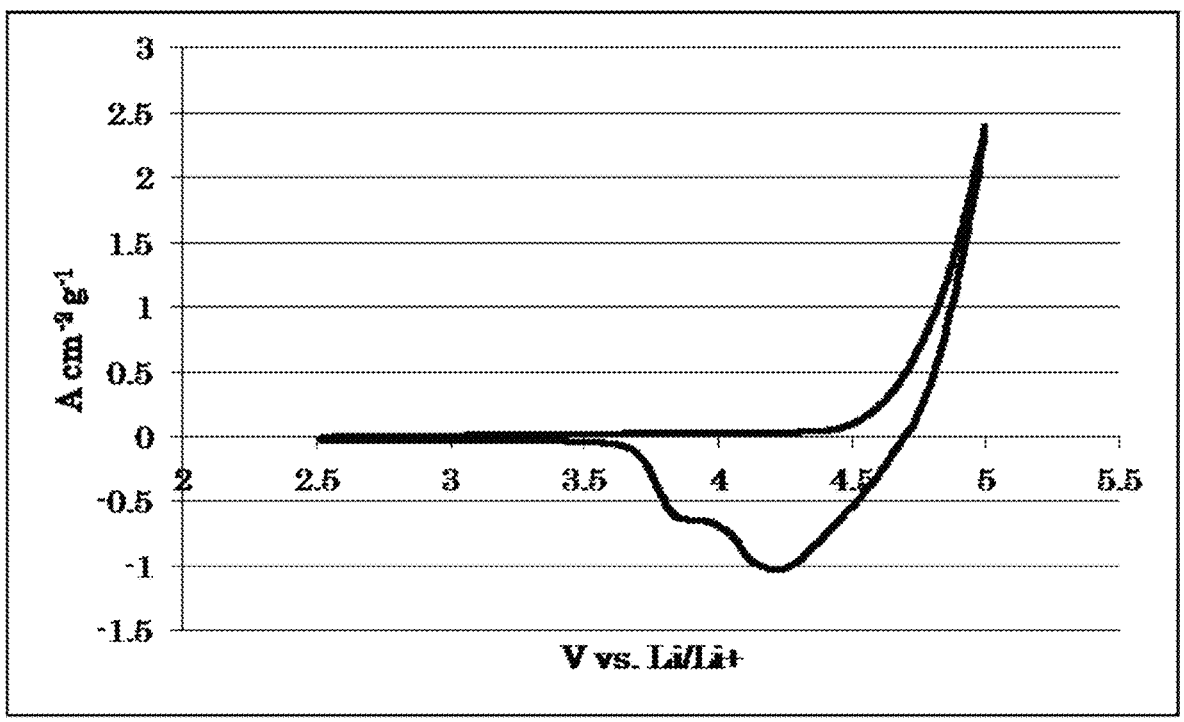

[Fig.3]
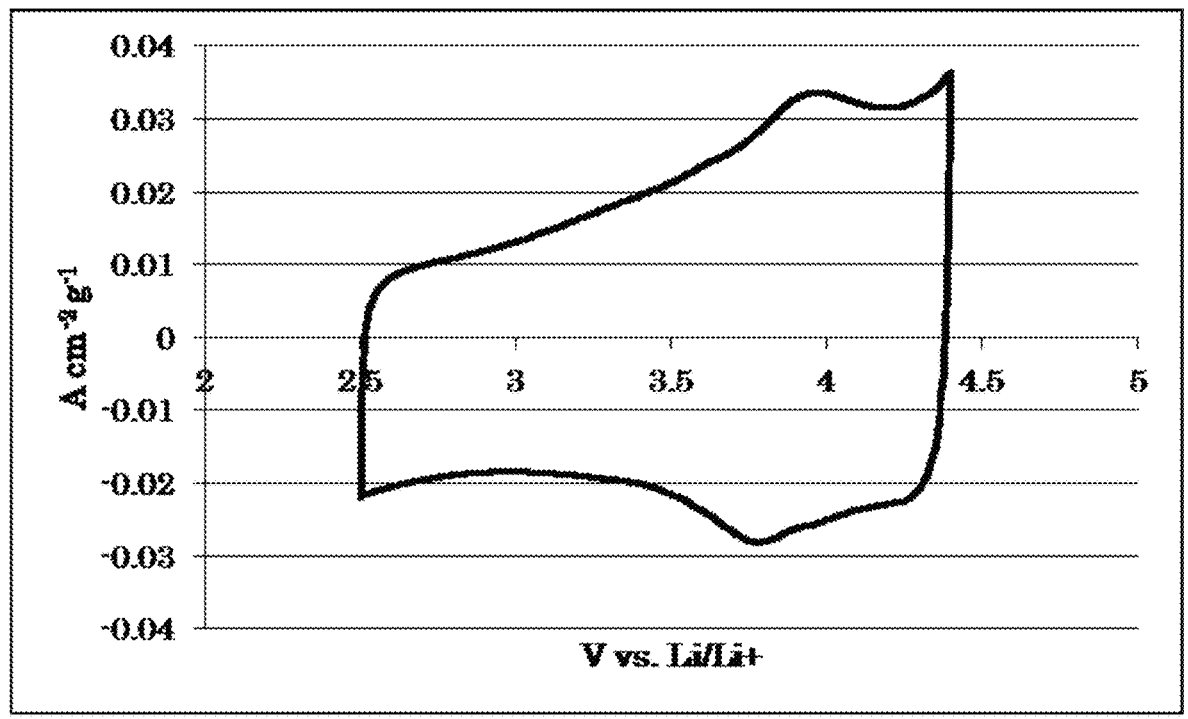
[Fig.4]
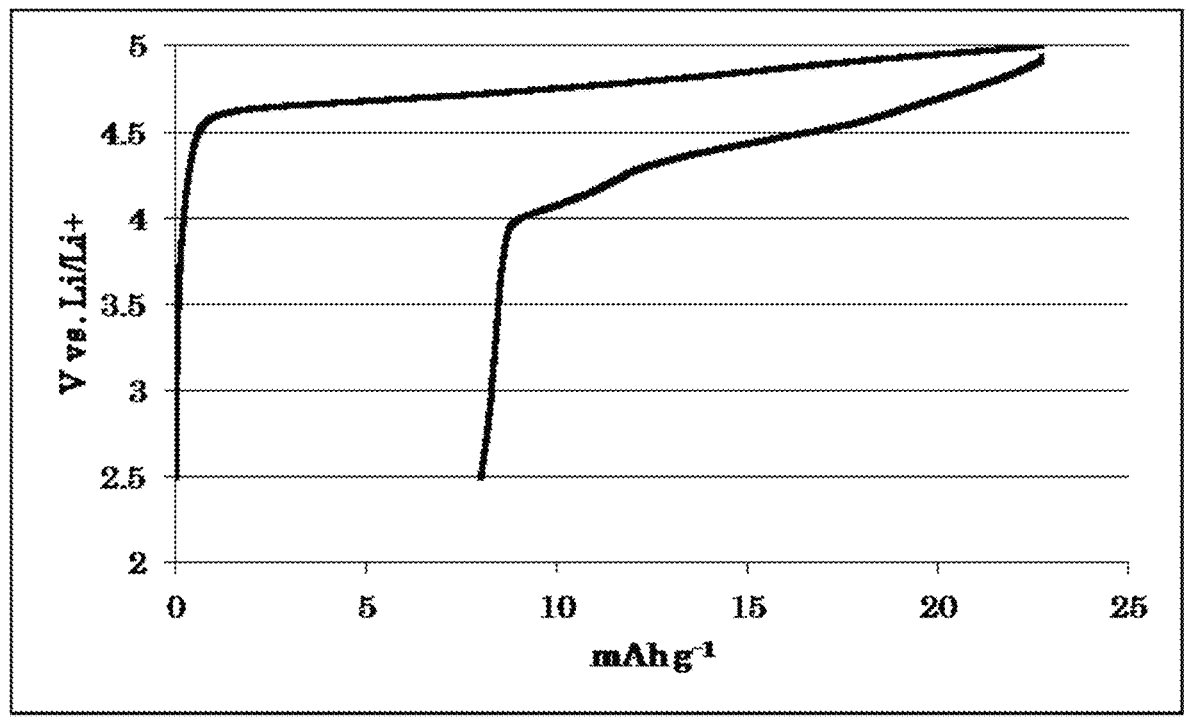

[Fig.5]
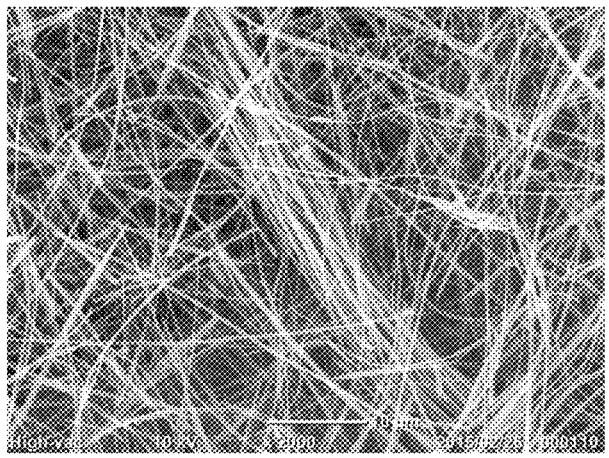
[Fig.6]
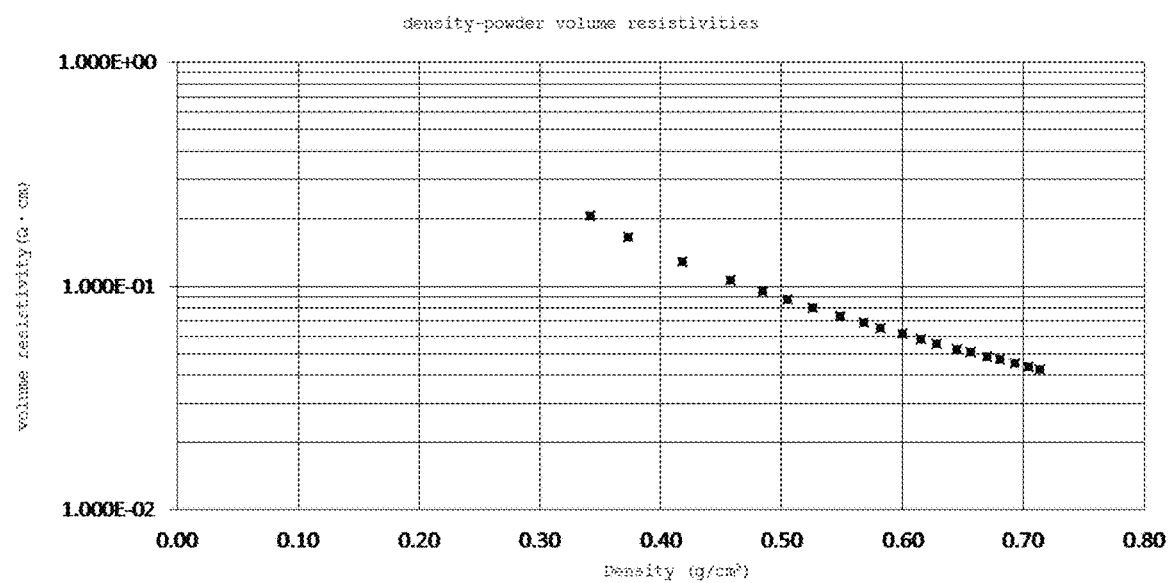
[Fig.7]
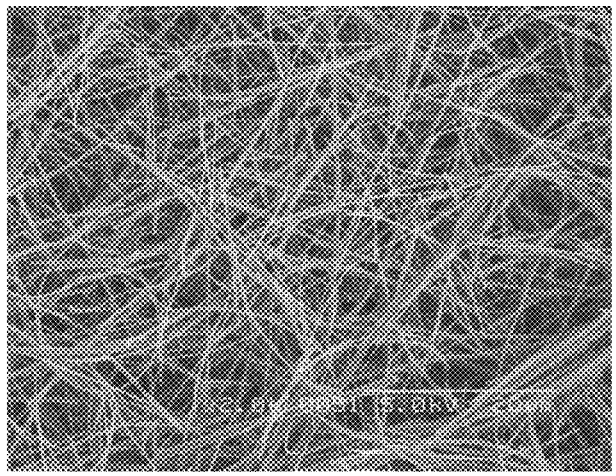

[Fig.8]
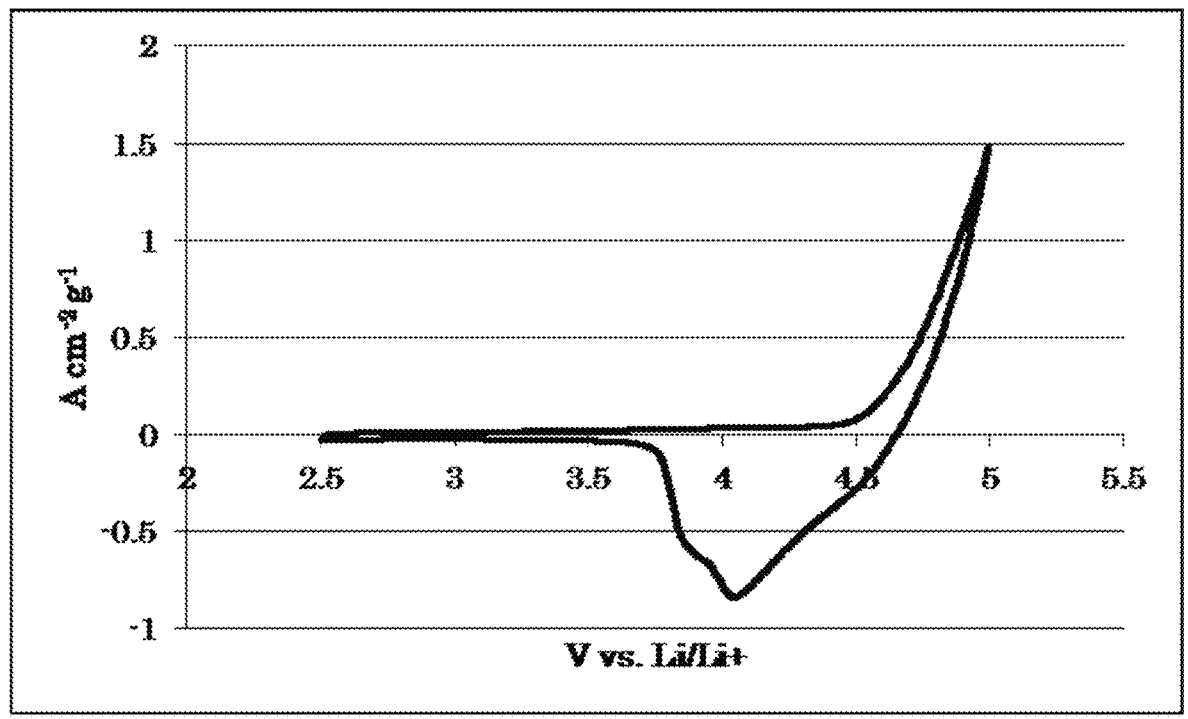
[Fig.9]
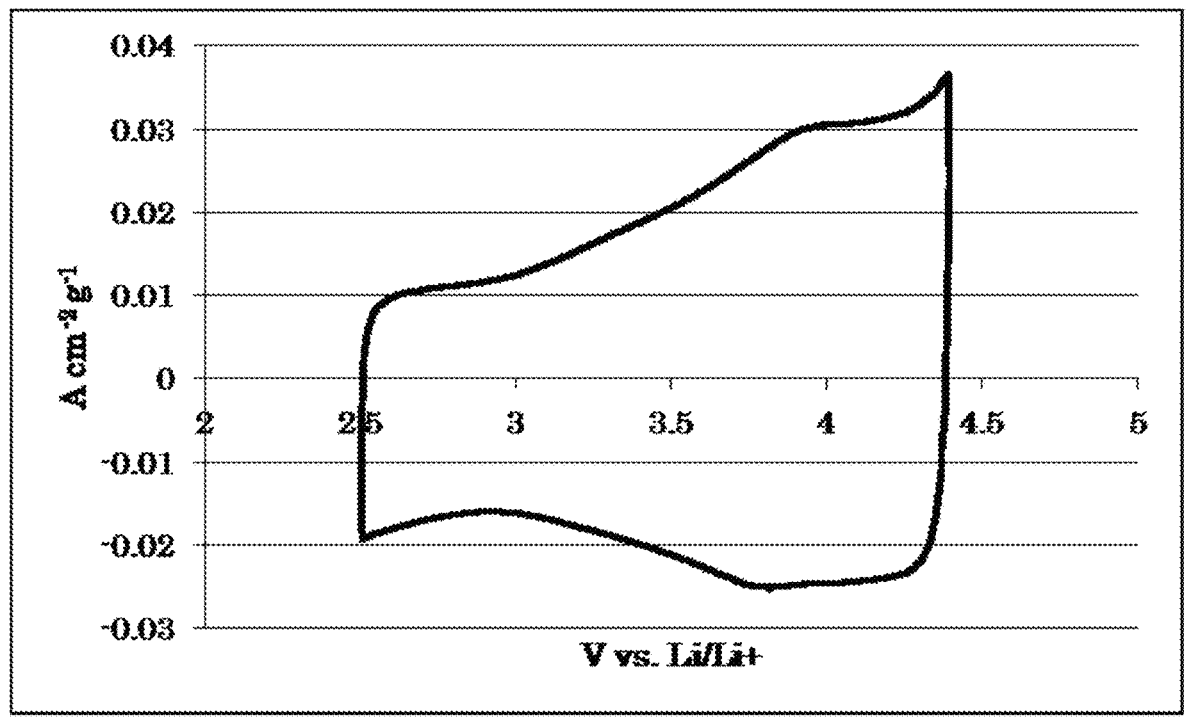

[Fig.10]
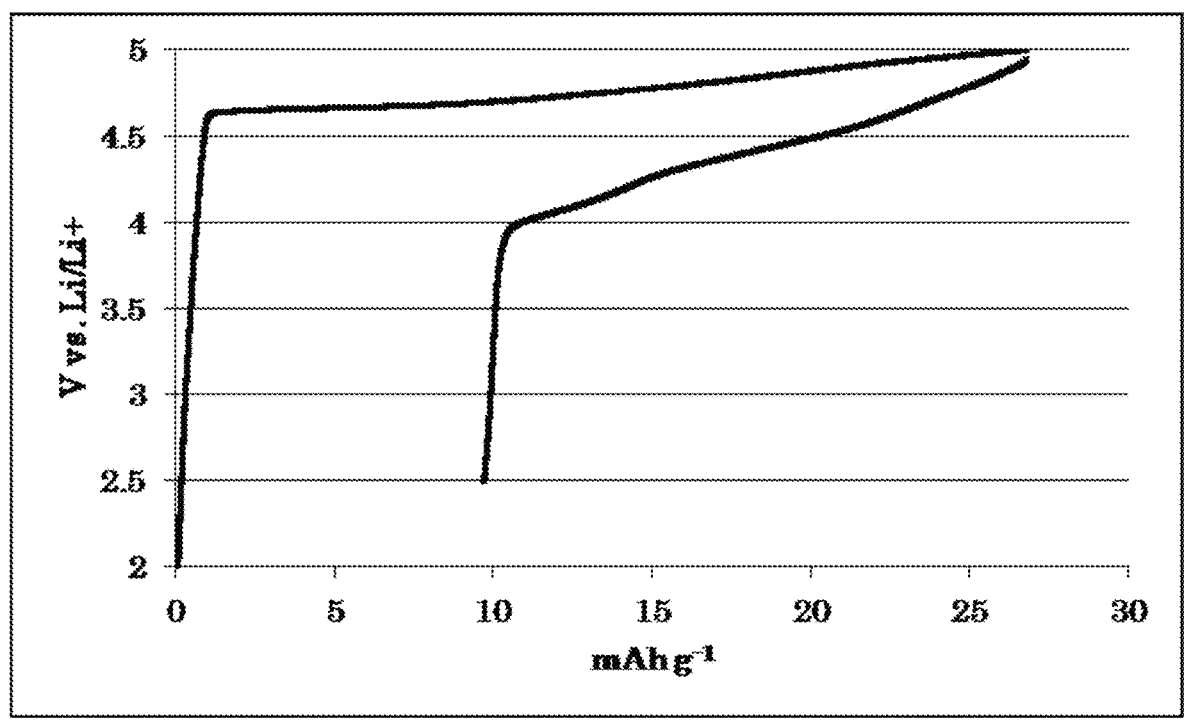
[Fig.11]
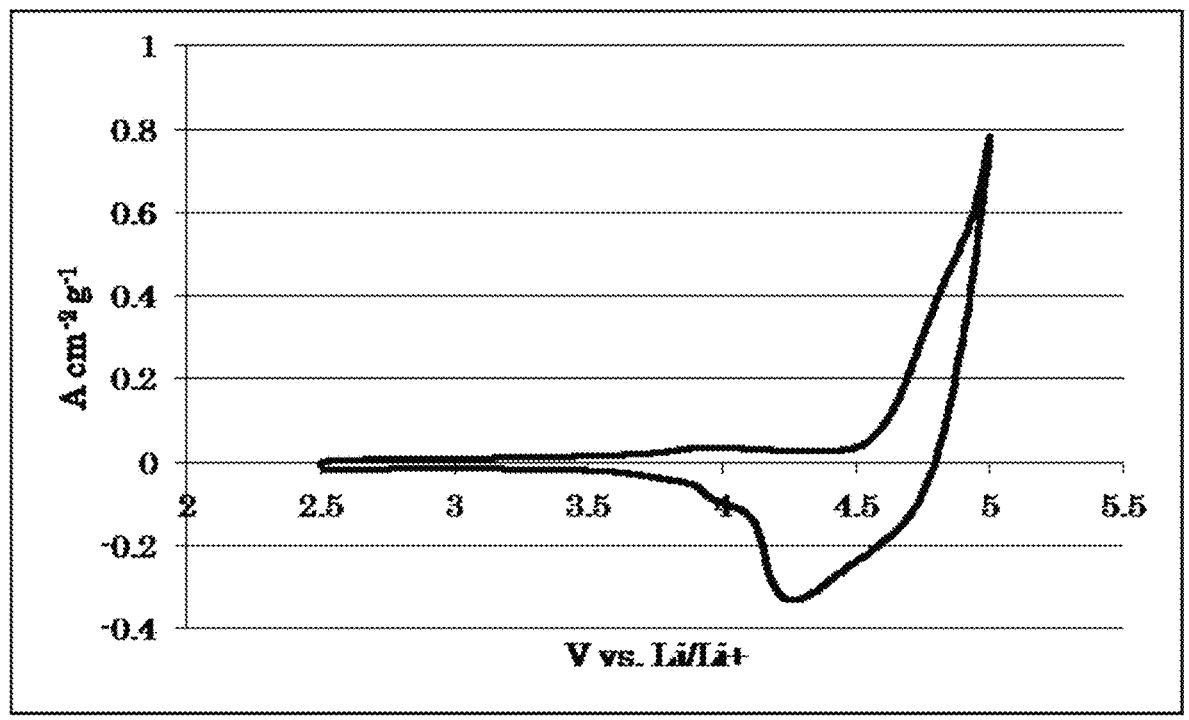

[Fig.12]
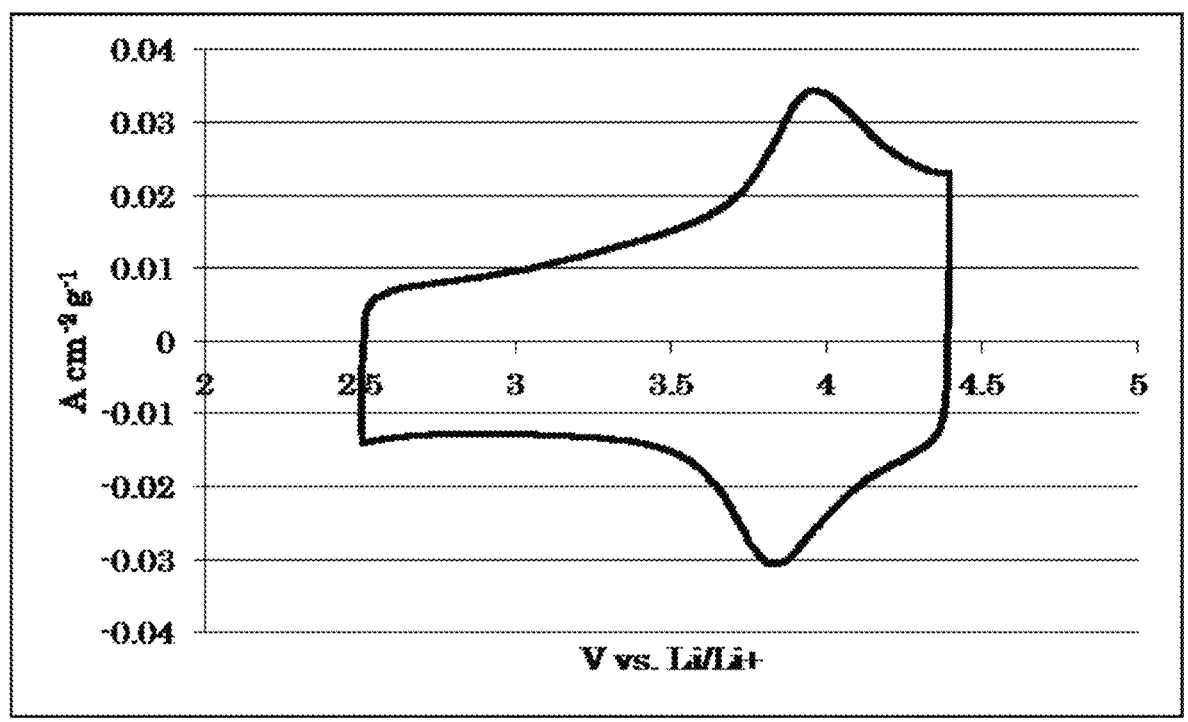
[Fig.13]
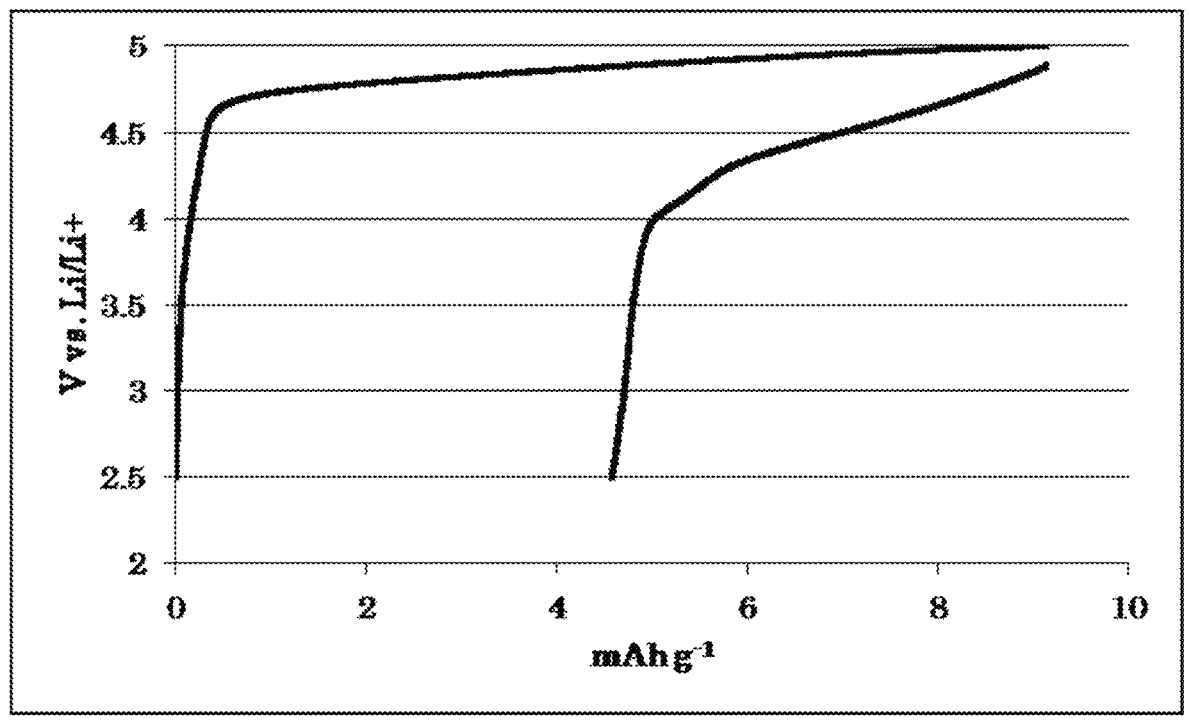

[Fig.14]
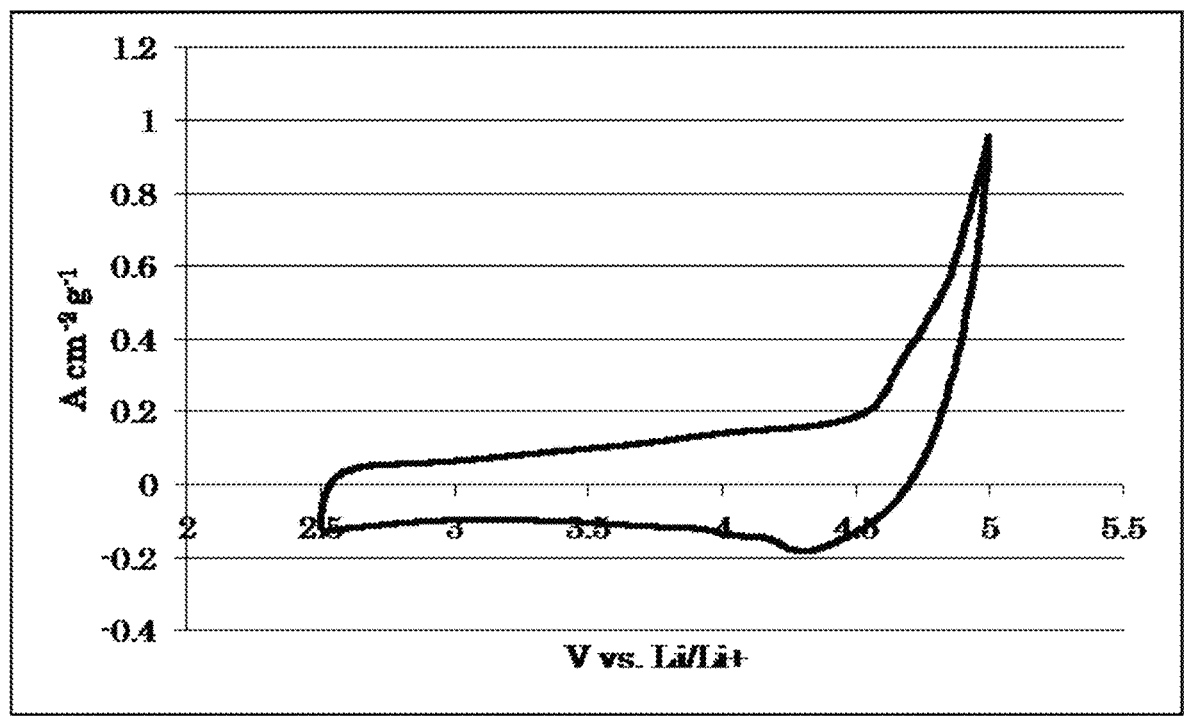
[Fig.15]
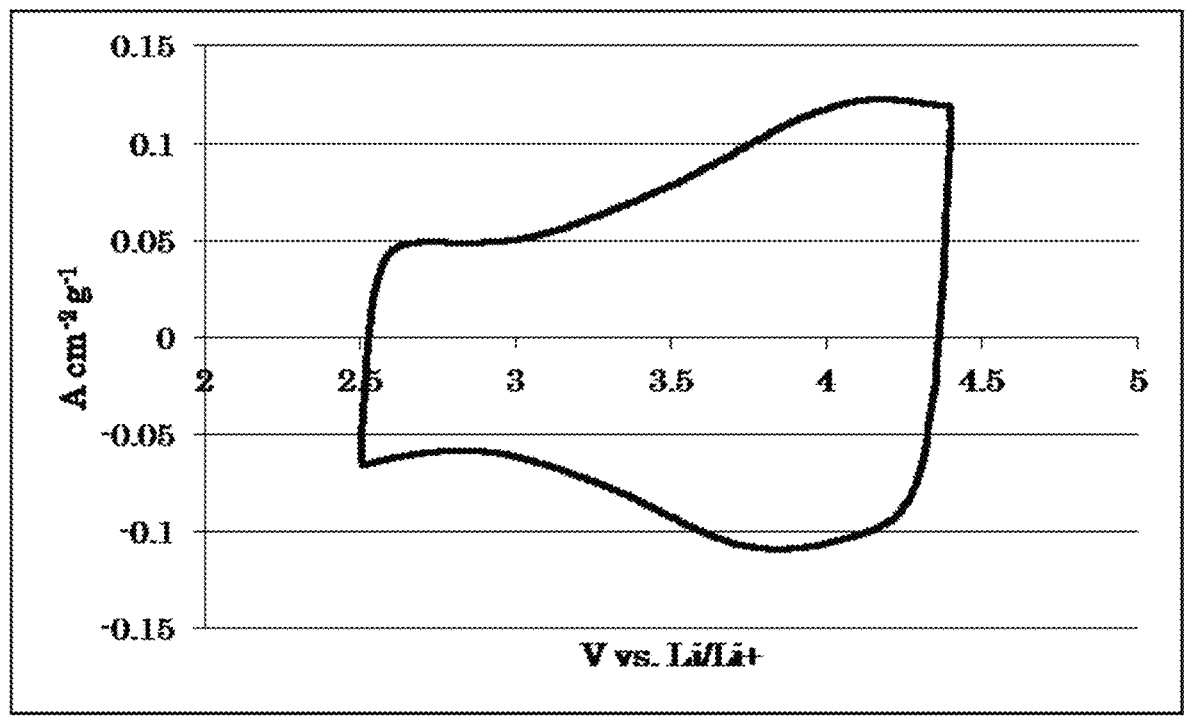

[Fig.16]
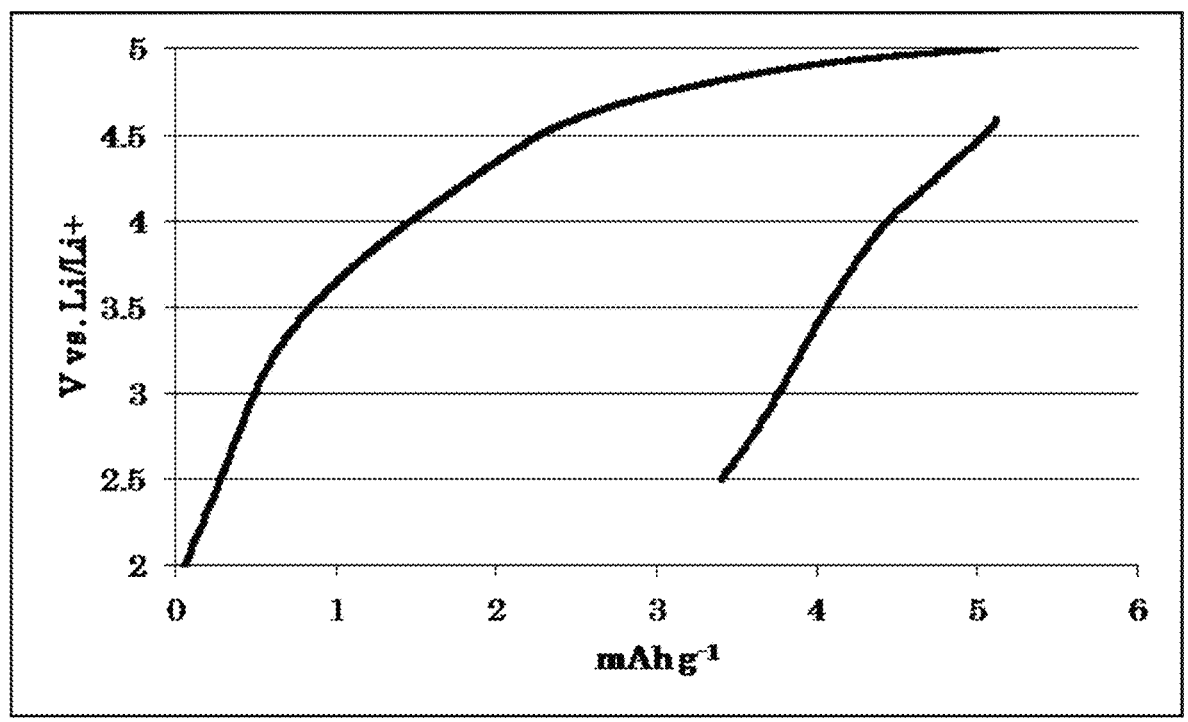
[Fig.17]
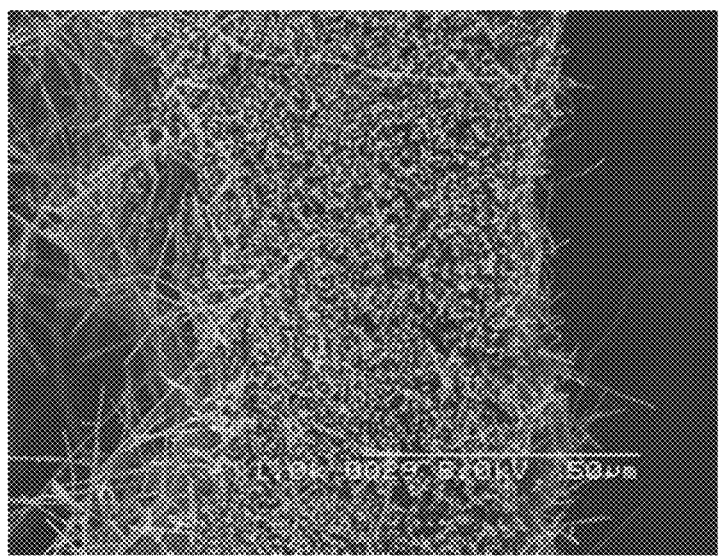

[Fig.18]
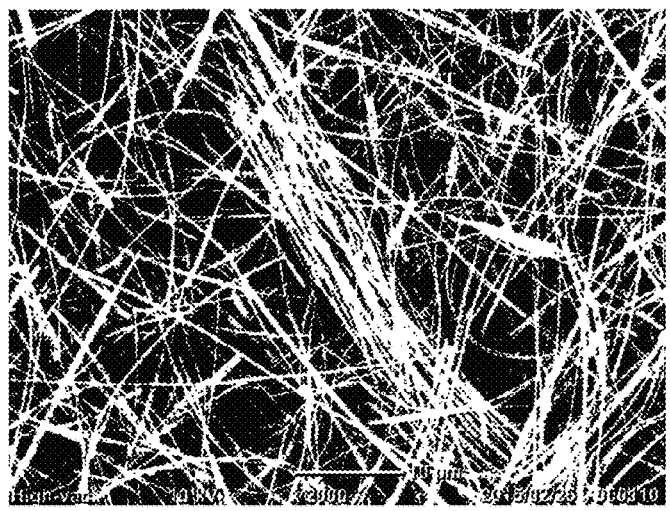
[Fig.19]
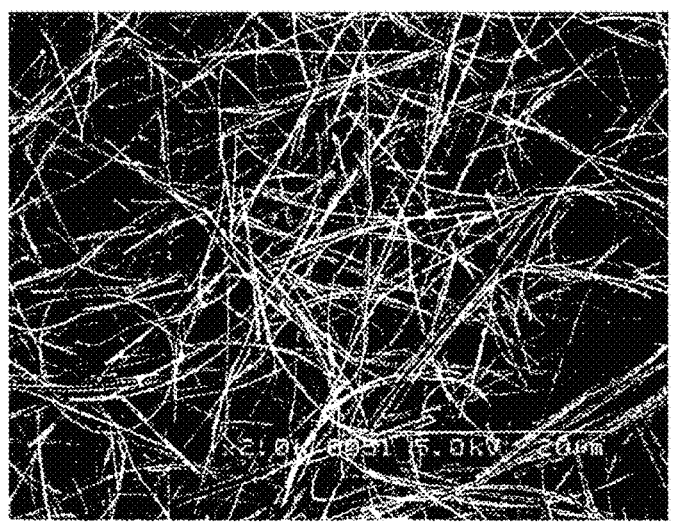
[Fig.20]
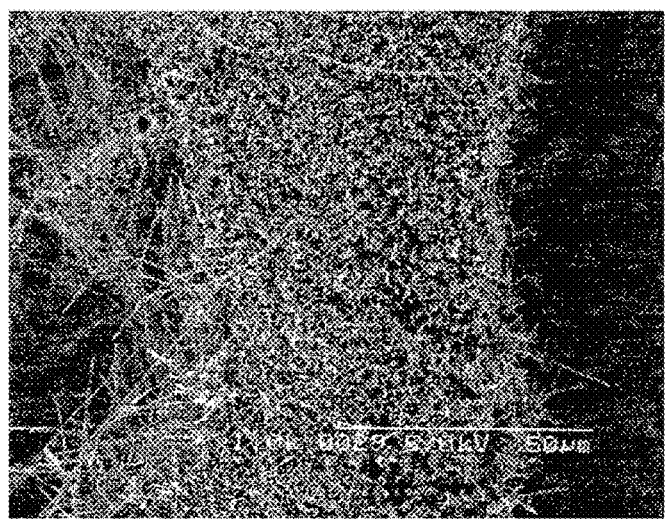

FIBROUS CARBON, METHOD FOR MANUFACTURING SAME, ELECTRODE MIXTURE LAYER FOR NON-AQUEOUS-ELECTROLYTE SECONDARY CELL, ELECTRODE FOR NON-AQUEOUS-ELECTROLYTE SECONDARY CELL, AND NON-AQUEOUS-ELECTROLYTE SECONDARY CELL

TECHNICAL FIELD

The present invention relates to a fibrous carbon, and particularly to a carbon fiber and a method for manufacturing the carbon fiber, and an electrode mixture layer for a nonaqueous electrolyte secondary battery which is formed using the fibrous carbon, an electrode for a nonaqueous electrolyte secondary battery which includes the electrode mixture layer, and a nonaqueous electrolyte secondary battery including the electrode.

BACKGROUND ART

Carbon nanomaterials, particularly ultrafine carbon fibers having an average fiber diameter of 1 μm or less, have excellent properties such as high crystallinity, high electroconductivity, high strength, a high elastic modulus and a small weight, and are therefore used as nanofillers of high-performance composite materials. The application of such carbon nanomaterials is not limited to reinforcing nanofillers intended for improvement of mechanical strength, and in view of high electroconductivity of a carbon material, an attempt has been made to use these carbon nanomaterials as materials to be added to electrodes in various kinds of batteries and capacitors, electromagnetic wave shielding materials, electroconductive nanofillers for antistatic materials, or nanofillers to be blended in electrostatic paints for resins. In addition, these carbon nanomaterials are expected to be used as electric field electron emission materials for flat displays and the like by taking advantage of characteristics with regard to chemical stability, thermal stability and microstructures as a carbon material. In particular, improvement of electroconductivity by addition of the carbon nanomaterial to a nonaqueous electrolyte secondary battery is greatly expected.

Patent Literature 1 discloses a method for manufacturing a carbon fiber, the method including the steps of: (1) forming a precursor molded body including 100 parts by mass of a thermoplastic resin, and 1 to 150 parts by mass of at least one thermoplastic carbon precursor selected from the group consisting of pitch, polyacrylonitrile, polycarbodiimide, polyimide, polybenzazole and aramid; (2) forming a stabilized resin composition by subjecting the precursor molded body to a stabilization treatment to stabilize the thermoplastic carbon precursor in the precursor molded body; (3) forming a fibrous carbon precursor by removing the thermoplastic resin from the stabilized resin composition under a reduced pressure; and (4) carbonizing or graphitizing the fibrous carbon precursor. A carbon fiber manufactured by this method has favorable characteristics, but when the carbon fiber is used as an electrode material, battery characteristics are insufficient, and thus further enhancement of a capacity and a power is required.

Patent Literature 2 describes a carbon material having a La of 1000 angstroms (100 nm) or more as a lithium ion absorbing material in a negative electrode.

Patent Literature 3 describes a pitch-based carbon fiber in which the ratio (La/Lc) of an extent La of a graphite crystal in a layer surface direction to a lamination thickness Lc of the graphite crystal is 1.5 or more. Patent Literature 3 describes a carbon fiber having a Lc of 35 nm or 33 nm in an example. The La of the carbon fiber is 61 nm or 56 nm in calculation. Therefore, a carbon fiber having a La of 100 nm or more is not specifically disclosed.

CITATION LIST

Patent Literature

Patent Literature 1: WO 2009/125857 A
Patent Literature 2: JP 10-134814 A
Patent Literature 3: JP 3031197 B2

SUMMARY OF INVENTION

Technical Problem

An object of the present invention is to provide a fibrous carbon, particularly a carbon fiber, which has improved crystallinity as compared to a conventional carbon fiber, and a method for manufacturing the fibrous carbon. Further, an electrode mixture layer for a nonaqueous electrolyte secondary battery which is formed using the fibrous carbon, an electrode for a nonaqueous electrolyte secondary battery which includes the electrode mixture layer, and a nonaqueous electrolyte secondary battery including the electrode.

Solution to Problem

The present inventors have extensively conducted studies in view of the above-mentioned conventional techniques, and resultantly found that by performing an operation for improving the molecular orientation property of a carbon precursor during a process for manufacturing a fibrous carbon, the crystallinity of the fibrous carbon obtained can be increased, leading to completion of the present invention.

That is, the present invention for solving the above-mentioned problems is as described below.

[1] A fibrous carbon having an average effective fiber length of 1 to 100 μm, and a crystallite length (La) of 100 to 500 nm as measured by an X-ray diffraction method.

The fibrous carbon according to [1] is a fibrous carbon material having a predetermined effective fiber length, and is fibrous carbon having high crystallinity. The fibrous carbon is manufactured by a predetermined manufacturing method capable of increasing crystallinity.

[2] The fibrous carbon according to [1], wherein the fibrous carbon has an average fiber diameter of 100 nm to 1 μm.

The fibrous carbon according to [2] is an ultrafine fibrous carbon having a small fiber diameter.

[3] The fibrous carbon according to [1], wherein the fibrous carbon has a boron content of 1 ppm by mass or less.

The fibrous carbon according to [3] is a fibrous carbon substantially free from boron, i.e. a fibrous carbon which is not doped with boron.

[4] The fibrous carbon according to [1], wherein the fibrous carbon is a pitch-based carbon fiber.

The fibrous carbon according to [4] is a fibrous carbon having pitch as a carbon precursor.

[5] An electrode mixture layer for a nonaqueous electrolyte secondary battery which includes
an electrode active material, and a carbon-based electroconductive aid containing the fibrous carbon according to [1].

The electrode mixture layer for a nonaqueous electrolyte secondary battery according to [5] is an electrode mixture for a nonaqueous electrolyte secondary battery which includes at least a particulate electrode active material, and the fibrous carbon according to [1], wherein at least the fibrous carbon according to [1] is dispersed in gaps between the particles of the electrode active material.

[6] The electrode mixture layer for a nonaqueous electrolyte secondary battery according to [5], wherein the electrode mixture layer for a nonaqueous electrolyte secondary battery has a thickness of 50 to 5000 μm.

The electrode mixture layer for a nonaqueous electrolyte secondary battery according to [6] is a thick electrode mixture layer for a nonaqueous electrolyte secondary battery.

[7] The electrode mixture layer for a nonaqueous electrolyte secondary battery according to [5] which does not generate an electrochemical reaction, wherein the ratio of an integrated value of reduction currents to an integrated value of oxidation currents is 0.6 or less in a cyclic voltammogram (CV) measured in a range of 2.5 to 5 V (vs. Li/Li+) using an ethylene carbonate/ethyl methyl carbonate mixed solution (volume (25° C.) ratio=3/7) containing $LiPF_6$ in a concentration of 1 mol/L while an electrode including the electrode mixture layer for a nonaqueous electrolyte secondary battery is used as a working electrode, and a lithium metal is used as a counter electrode.

The electrode mixture layer for a nonaqueous electrolyte secondary battery according to [7] is an electrode mixture layer for a nonaqueous electrolyte secondary battery which does not generate an irreversible electrochemical reaction in a potential range of 2.5 to 5 V (vs. Li/Li+).

[8] The electrode mixture layer for a nonaqueous electrolyte secondary battery according to [5], wherein the fibrous carbon is a fibrous carbon that satisfies the following formula (1) in a cyclic voltammogram (CV) measured in a potential range of 2.5 to 4.4 V (vs. Li/Li+) using an ethylene carbonate/ethyl methyl carbonate mixed solution (volume (25° C.) ratio=3/7) containing $LiPF_6$ in a concentration of 1 mol/L while an electrode including 100 parts by mass of an electrode mixture layer for a nonaqueous electrolyte secondary battery which includes 50 parts by mass of the fibrous carbon and 50 parts by mass of polyvinylidene fluoride is used as a working electrode, and a lithium metal is used as a counter electrode:

$$IA/IB<0.02 \quad \text{Formula (1)}$$

(where IA is the highest of current values when the oxidation current takes the maximum value in cyclic voltammogram measurement in a potential range of 2.5 to 4.4 V (vs. Li/Li+), and IB is a current value at 5 V in cyclic voltammogram measurement in a potential range of 2.5 to 5 V (vs. Li/Li+)).

The electrode mixture layer for a nonaqueous electrolyte secondary battery according to [8] is an electrode mixture layer for a nonaqueous electrolyte secondary battery which includes a fibrous carbon that does not generate an electrochemical reaction in a potential range of 2.5 to 4.4 V (vs. Li/Li+).

[9] An electrode for a nonaqueous electrolyte secondary battery which includes
a current collector, and
the electrode mixture layer for a nonaqueous electrolyte secondary battery according to [5] which is laminated on the current collector.

The electrode for a nonaqueous electrolyte secondary battery according to [9] is an electrode for a nonaqueous electrolyte secondary battery which includes a current collector, and the electrode mixture layer according to [5] which is laminated on and integrated with at least one surface of the current collector.

[10] A nonaqueous electrolyte secondary battery including the electrode for a nonaqueous electrolyte secondary battery according to [9].

The nonaqueous electrolyte secondary battery according to [10] is a nonaqueous electrolyte secondary battery in which the positive electrode or the negative electrode, or each of the positive electrode and the negative electrode is the electrode according to [9].

[11] A method for manufacturing a fibrous carbon, the method including:

(1) a fiber formation step of preparing a resin composite fiber by molding a resin composition in a molten state to form a mesophase pitch into a fiber, the resin composition including a thermoplastic resin, and 1 to 150 parts by mass of the mesophase pitch based on 100 parts by mass of the thermoplastic resin;

(2) a stabilization step of stabilizing the resin composite fiber to prepare a resin composite stabilized fiber;

(3) a thermoplastic resin removing step of removing the thermoplastic resin from the resin composite stabilized fiber to prepare a stabilized fiber; and (4) a carbonization and firing step of preparing a fibrous carbon by heating the stabilized fiber under an inert atmosphere to carbonize or graphitize the stabilized fiber, the fiber formation step including mesophase pitch orientation control operation.

The method for manufacturing a fibrous carbon according to [11] is a manufacturing method including an operation of controlling the molecular orientation property of a mesophase pitch at the time when a resin composition having a sea-island structure of a thermoplastic resin and a mesophase pitch is spun or film-formed in a molten state in the (1) fiber formation step. That is, the method includes a fiber formation step of spinning or depositing a resin composition and improving the molecular orientation property of a mesophase pitch.

[12] The method for manufacturing a fibrous carbon according to [11], wherein
the orientation control operation includes at least one of a method in which strain is applied by shearing and a method in which strain is applied by extension.

The manufacturing method according to [12] is a manufacturing method in which the orientation control operation is carried out by shearing or extension in a spinning nozzle or a rectangular nozzle.

[13] The method for manufacturing the fibrous carbon according to [11], wherein
each of the shear strain rate and the extension strain rate in the method in which strain is applied by shearing and the method in which strain is applied by extension is 5 to 10000 $s^{-1}$.

The manufacturing method according to [13] is a manufacturing method in which the shear strain rate and the extension strain rate are controlled to fall within a predetermined range.

[14] The method for manufacturing the fibrous carbon according to [11], wherein
the method in which strain is applied by extension includes extension on the downstream side of the nozzle.

The manufacturing method according to [14] is a manufacturing method in which a resin composition discharged from a spinning hole or a slit of a spinning nozzle or a rectangular nozzle is elongated to form a mesophase pitch into a fiber, and improve the molecular orientation property of the mesophase pitch in the resin composition.

Advantageous Effects of Invention

According to the present invention, a fibrous carbon having improved crystallinity as compared to a carbon material obtained in a conventional technique can be obtained, and suitably used as a battery material. In addition, the fibrous carbon of the present invention is promising for use as reinforcing nanofillers, materials to be added to electrodes of capacitors, electromagnetic wave shielding materials, electroconductive nanofillers for antistatic materials, nanofillers to be blended in electrostatic paints for resins, electric field electron emission materials for flat displays in addition to battery materials.

BRIEF DESCRIPTION OF DRAWINGS

FIG. 1 is a sectional view showing an internal structure of a discharge port portion of a spinning nozzle.

FIG. 2 shows a cyclic voltammogram (CV curve) measured in a potential range of 2.5 to 5 V (vs. Li/Li+) using an electrode in Example 1.

FIG. 3 shows a cyclic voltammogram (CV curve) measured in a potential range of 2.5 to 4.4 V (vs. Li/Li+) using the electrode in Example 1.

FIG. 4 shows results of charge-discharge measurement of a battery in Example 1.

FIG. 5 shows an electron micrograph (2000×) of an ultrafine fibrous carbon in Example 2.

FIG. 6 is a graph showing the density-powder volume resistivities of ultrafine fibrous carbons in Example 2 and Example 3.

FIG. 7 shows an electron micrograph (2000×) of the ultrafine fibrous carbon in Example 3.

FIG. 8 shows a cyclic voltammogram (CV curve) measured in a potential range of 2.5 to 5 V (vs. Li/Li+) using an electrode in Comparative Example 1.

FIG. 9 shows a cyclic voltammogram (CV curve) measured in a potential range of 2.5 to 4.4 V (vs. Li/Li+) using the electrode in Comparative Example 1.

FIG. 10 shows results of charge-discharge measurement of a battery in Comparative Example 1.

FIG. 11 shows a cyclic voltammogram (CV curve) measured in a potential range of 2.5 to 5 V (vs. Li/Li+) using an electrode in Comparative Example 2.

FIG. 12 shows a cyclic voltammogram (CV curve) measured in a potential range of 2.5 to 4.4 V (vs. Li/Li+) using the electrode in Comparative Example 2.

FIG. 13 shows results of charge-discharge measurement of a battery in Comparative Example 2.

FIG. 14 shows a cyclic voltammogram (CV curve) measured in a potential range of 2.5 to 5 v (vs. Li/Li+) using an electrode in Comparative Example 3.

FIG. 15 shows a cyclic voltammogram (CV curve) measured in a potential range of 2.5 to 4.4 V (vs. Li/Li+) using the electrode in Comparative Example 3.

FIG. 16 shows results of charge-discharge measurement of a battery in Comparative Example 3.

FIG. 17 shows an electron micrograph (2000×) of an ultrafine fibrous carbon precursor in Example 4.

FIG. 18 is a reference diagram in which the electron micrograph in FIG. 5 is output in a white and black binary.

FIG. 19 is a reference diagram in which the electron micrograph in FIG. 7 is output in a white and black binary.

FIG. 20 is a reference diagram in which the electron micrograph in FIG. 17 is output in a white and black binary.

DESCRIPTION OF EMBODIMENTS

Hereinafter, the present invention will be described.

1. Fibrous Carbon 1-1. Properties of Fibrous Carbon

A fibrous carbon of the present invention is substantially composed of carbon, and examples thereof include graphite, graphene, carbon nanotube carbon nanohorn, fullerene, carbon black, activated carbon and carbon fiber. The fibrous carbon of the present invention is characterized by its high crystallinity. The crystallite length (La) serving as an index of crystallinity and measured by an X-ray diffraction method is 100 to 500 nm, preferably 110 to 500 nm, more preferably 130 to 500 nm. When the crystallite length (La) is less than 100 nm, the electroconductivity of the fibrous carbon is not sufficient. While the crystallite size is measured by an X-ray diffraction method, a measurement error becomes large as the crystal grows greatly, and therefore practically the limit of measurement is 500 nm.

In the present invention, the crystallite length (La) measured by X-ray diffractometry is a value measured in accordance with Japanese Industrial Standard JIS R 7651 (2007 edition) "Lattice Constant of Carbon Material and Method for Measuring Crystallite Size".

Preferably, the fibrous carbon of the present invention has high electroconductivity at a low packing density. This is because a fibrous carbon having high electroconductivity at a low packing density can impart electroconductivity at a lower addition concentration. Specifically, the powder volume resistance in packing of the fibrous carbon at a packing density of 0.4 g/cm$^3$ is preferably 1 Ω·cm or less, more preferably 0.5 Ω·cm or less. It is not preferable that the packing density is more than 1 Ω·cm because the addition amount of the fibrous carbon which is required for improving electroconductivity increases. The lower limit value is not particularly limited, but it is generally about 0.0001 Ω·cm.

The fibrous carbon of the present invention is preferably a carbon fiber from the viewpoints of an ability to form an electroconductive network in an electrode mixture layer, improvement of battery power, and improvement of battery durability. Carbon fibers also include vapor growth carbon materials such as carbon nanotubes and carbon nanoribbons. A pitch-based carbon fiber is preferable to PAN based carbon fiber because it is a carbon material having high crystallinity.

The fibrous carbon of the present invention has a lattice spacing (d002) of preferably 0.335 to 0.340 nm, more preferably 0.335 to 0.339 nm as measured by an X-ray diffraction method. When the lattice spacing is in a range of 0.335 to 0.340 nm, the fibrous carbon has high graphite crystallinity and excellent oxidation resistance.

In the fibrous carbon of the present invention, the thickness (Lc) of graphene (layered planar structure) is preferably 1.0 to 130 nm. It is not preferable that the thickness (Lc) is less than 1.0 nm because the electroconductivity of the carbon material is noticeably deteriorated. The lower limit value of Lc is more preferably 5 nm or more, still more preferably 10 nm or more, still more preferably 30 nm or more, especially preferably 50 nm or more. The upper limit value of Lc is preferably 150 nm or less, more preferably 130 nm or less, especially preferably 100 nm or less.

The average fiber diameter of the fibrous carbon of the present invention is preferably 10 to 1000 nm. The upper limit value of the average fiber diameter is preferably 900 nm or less, more preferably 800 nm or less, still more preferably 700 nm or less, still more preferably 600 nm or less, especially preferably 550 nm or less, most preferably 500 nm or less. The lower limit value of the average fiber diameter is preferably 50 nm or more, more preferably 100 nm or more, still more preferably 150 nm or more.

When the average fiber diameter is less than 10 nm, the fibrous carbon has a very small bulk density, and is thus poor in handling characteristics. In addition, the electrode strength tends to decrease when an electrode mixture layer is formed. When the average fiber diameter is more than 1000 nm, gaps may be easily generated in the electrode mixture layer, thus making it difficult to increase the electrode density.

Here, the fiber diameter in the present invention means a value measured using a photographic picture taken at a magnification of 2,000 by a field emission-type scanning electron microscope.

The average effective fiber length of the fibrous carbon is preferably 1 to 100 μm, more preferably 1 to 50 μm, still more preferably 5 to 20 μm. It is not preferable that the average effective fiber length is less than 1 μm because electroconductivity in the electrode mixture layer, the strength of the electrode, and electrolyte solution retainability are deteriorated. It is not preferable the average effective fiber length is more than 100 μm because dispersibility of the fibrous carbon is impaired. That is, when the fibrous carbon is excessively long, the fibrous carbon is easily oriented in the in-surface direction of the electrode mixture layer (a direction parallel to the surface of the electrode mixture layer). That is, orientation of the fibrous carbon in the thickness direction of the electrode mixture layer (a direction perpendicular to the surface of the electrode mixture layer) is hindered, and as a result, an electroconductive path is hardly formed in the thickness direction of the electrode mixture layer.

In the present invention, the length of the fiber is defined by an effective fiber length rather than an actual fiber length. This is because the fibrous carbon does not necessarily contribute to electroconductivity with the actual fiber length in the electrode mixture layer. For example, the fiber is bent or rounded in the electrode mixture layer, and therefore there are cases where the fibrous carbon does not contribute to electroconductivity with the actual fiber length. In the present invention, the effective fiber length of the fibrous carbon is defined as a length of the longest line segment, the both ends of which are in contact with a single fibrous carbon. In other words, the effective fiber length is the maximum linear distance over which a single fibrous carbon can be made electrically conductive. That is, when the fibrous carbon has a completely linear structure, the effective fiber length is substantially equal to the fiber length. When fibrous carbon has a branched structure or is rounded, the effective fiber length refers to the length of the largest line segment connecting two points on the single fibrous carbon.

The ratio (L/D) of the average effective fiber length (L) to the average fiber diameter (D) of the fibrous carbon of the present invention is preferably 30 or more, more preferably 40 or more. When the ratio (L/D) is 30 or more, an electroconductive path is efficiently formed in the electrode mixture layer, and the cycle characteristics of the resulting battery can be improved. When the ratio (L/D) is less than 30, formation of an electroconductive path in the electrode mixture layer is apt to be insufficient, so that it may be unable to sufficiently reduce the resistance value of the electrode mixture layer in the thickness direction. The upper limit of the ratio (L/D) is not particularly limited, but it is generally 10000 or less, preferably 5000 or less, more preferably 1000 or less. It is not preferable that the ratio (L/D) is more than 10000 because dispersibility of the fibrous carbon is impaired.

The fibrous carbon of the present invention is not particularly limited, but preferably, the fibrous carbon has a linear structure with substantially no branching. The branching means that the main axis of the fibrous carbon is branched midway, and that the main axis of the fibrous carbon has a branched secondary axis. The linear structure with substantially no branching means that the degree of branching of the fibrous carbon is 0.01 pieces/μm or less.

The fibrous carbon may be in a fibrous form as a whole. For example, a plurality of fibrous carbons come into contact with one another, or are combined with one another to integrally form a fiber shape (e.g. fibrous carbons are connected in the form of a rosary, or one or more extremely staple fibers are combined by fusion or the like).

In the fibrous carbon of the present invention, the total content of metal elements is preferably 50 ppm or less, more preferably 30 ppm or less, still more preferably 20 ppm or less. When the metal content is more than 50 ppm, the battery is easily degraded by the catalytic action of the metal. In the present invention, the content of metal elements means the total content of Li, Na, Ti, Mn, Fe, Ni and Co. In particular, the content of Fe is preferably 5 ppm or less, more preferably 3 ppm or less, still more preferably 1 ppm or less. It is not preferable the content of Fe is more than 5 ppm because particularly the battery is easily degraded.

In the fibrous carbon of the present invention, the content of each of hydrogen, nitrogen and ash in the fiber is preferably 0.5% by mass or less, more preferably 0.3% by mass or less. It is preferable that the content of each of hydrogen, nitrogen and ash in the fibrous carbon is 0.5% by mass or less because structural defects of the graphite layer are further suppressed, and side reactions in the battery can be suppressed.

Preferably, the fibrous carbon of the present invention does not substantially contain boron. When a boron atom combined with a carbon atom is present on the surface of the fibrous carbon, the boron atom may act as an active point and cause a decomposition reaction of the battery electrolyte. Here, the phrase "does not substantially contain" means that the boron content is 1 ppm by mass or less.

The fibrous carbon of the present invention is preferably a fibrous carbon that satisfies the following formula (1) in a cyclic voltammogram (CV) measured in a potential range of 2.5 to 4.4 V (vs. Li/Li+) using an ethylene carbonate/ethyl methyl carbonate mixed solution (volume (25° C.) ratio=3/7) containing $LiPF_6$ in a concentration of 1 mol/L while an electrode including 100 parts by mass of an electrode mixture layer for a nonaqueous electrolyte secondary battery which includes 50 parts by mass of the fibrous carbon and 50 parts by mass of polyvinylidene fluoride is used as a working electrode, and a lithium metal is used as a counter electrode:

$$IA/IB < 0.02 \qquad \text{Formula (1)}$$

(where IA is the highest of current values when the oxidation current takes the maximum value in cyclic voltammogram measurement in a potential range of 2.5 to 4.4 V (vs. Li/Li+), and IB is a current value at 5 V in cyclic voltammogram measurement in a potential range of 2.5 to 5 V (vs. Li/Li+)).

That is, it is preferable that the fibrous carbon of the present invention does not generate an electrochemical reaction in a potential range of 2.5 to 4.4 V (vs. Li/Li+). Here, the phrase "not generate an electrochemical reaction" means having no substantial peak in a cyclic voltammogram (CV) measured in a potential range of 2.5 to 4.4 V (vs. Li/Li+) while an electrode including 100 parts by mass of an electrode mixture layer including 50 parts by mass of the fibrous carbon and 50 parts by mass of polyvinylidene fluoride (W #7200 manufactured by KUREHA CORPORATION) is used as a working electrode, a lithium metal is used as a counter electrode, and an ethylene carbonate/ethyl methyl carbonate mixed solution (volume (25° C.) ratio=3/7, manufactured by Kishida Chemical Co., Ltd.) containing $LiPF_6$ in a concentration of 1 mol/L is used as a solvent. Here, the phrase "having no substantial peak" means satisfying the formula (1).

By using a fibrous carbon which does not show an electrochemical reaction in a potential range of 2.5 to 4.4 V (vs. Li/Li+), there can be provided a nonaqueous electrolyte secondary battery in which side reactions such as decomposition of an electrolytic solution and a reaction of an electroconductive aid with the electrolytic solution hardly occur under a high voltage.

1-2. Method for Manufacturing Fibrous Carbon

A method for manufacturing a pitch-based carbon fiber which is a preferred form of the fibrous carbon of the present invention will be described below. The pitch-based carbon fiber of the present invention can be manufactured by passing through, for example, the following steps (1) to (4):

(1) a fiber formation step of preparing a resin composite fiber by molding a resin composition in a molten state to form a mesophase pitch into a fiber, the resin composition including a thermoplastic resin, and 1 to 150 parts by mass of the mesophase pitch based on 100 parts by mass of the thermoplastic resin, the fiber formation step including an orientation control operation for improving the molecular orientation property of the mesophase pitch; (2) a stabilization step of stabilizing the resin composite fiber to prepare a resin composite stabilized fiber; (3) a thermoplastic resin removing step of removing the thermoplastic resin from the resin composite stabilized fiber to prepare a stabilized fiber; and (4) a carbonization and firing step of preparing an ultrafine carbon fiber by heating the stabilized fiber under an inert atmosphere to carbonize or graphitize the stabilized fiber.

Thermoplastic Resin

The thermoplastic resin to be used in the method for manufacturing the pitch-based carbon fiber of the present invention is capable of producing a resin composite fiber, and should be easily removed in the thermoplastic resin removing step. Examples of the thermoplastic resin include polyolefins, polyacrylate-based polymers such as polymethacrylate and polymethyl methacrylate, polystyrene, polycarbonate, polyarylate, polyester polyamide, polyester carbonate, polysulfone, polyimide, polyetherimide, polyketone and polylactic acid. Among them, polyolefins are preferably used.

Specific examples of the polyolefin include polyethylene, polypropylene, poly-4-methylpentene-1, and copolymers containing these polymers. Polyethylene is preferably used because it is easily removed in the thermoplastic resin removing step. Examples of the polyethylene include homopolymers such as high-pressure low-density polyethylene, low-density polyethylene such as gas-phase/solution/high-pressure linear low-density polyethylene, medium-density polyethylene and high-density polyethylene; and copolymers of ethylene and other vinyl-based monomer such as copolymers of ethylene and an α-olefin and ethylene-vinyl acetate copolymers.

The thermoplastic resin for use in the present invention preferably has a melt mass flow rate (MFR) of preferably 0.1 to 10 g/10 min, more preferably 0.1 to 5 g/10 min, especially preferably 0.1 to 3 g/10 min as measured in accordance with JIS K 7210 (1999). When the MFR is in the above-mentioned range, the mesophase pitch can be favorably microdispersed in the thermoplastic resin. In addition, in molding of the resin composite fiber, the fiber is stretched, so that the fiber diameter of the resulting carbon fiber can be further reduced. The thermoplastic resin for use in the present invention has a glass transition temperature of preferably 250° C. or lower when being amorphous, and a melting point of preferably 300° C. or lower when being crystalline for ensuring that the thermoplastic resin can be easily melt-kneaded with the mesophase pitch.

Mesophase Pitch

The mesophase pitch is a pitch capable of forming an optically anisotropic phase (liquid crystal phase) in a molten state. Examples of the mesophase pitch for use in the present invention include those obtained using a distillation residue of coal or petroleum as a raw material, and those obtained using an aromatic hydrocarbon such as naphthalene as a raw material. For example, a mesophase pitch derived from coal is obtained by a treatment mainly including hydrogenation/heat treatment of coal tar pitch; or a treatment mainly including hydrogenation/heat treatment/solvent extraction.

More specifically, the mesophase pitch can be obtained by the following method. First, a coal tar pitch freed of a quinoline-insoluble component and having a softening point of 80° C. is hydrogenated in the presence of a Ni—Mo based catalyst at a pressure of 13 MPa and a temperature of 340° C. to obtain a hydrogenated coal tar pitch. The hydrogenated coal tar pitch is heat-treated at 480° C. under atmospheric pressure, and then decompressed to remove a low-boiling-point component, so that a crude mesophase pitch is obtained. Using a filter, the crude mesophase pitch is filtered at a temperature of 340° C. to remove foreign matters, whereby a purified mesophase pitch can be obtained.

The optical anisotropy content (mesophase ratio) of the mesophase pitch is preferably 80% or more, more preferably 90% or more.

In addition, the softening point of the mesophase pitch is preferably 100 to 400° C., more preferably 150 to 350° C.

Resin Composition

Preferably, a resin composition (hereinafter, also referred to as a mesophase pitch composition) which is used in the method for manufacturing the pitch-based carbon fiber of the present invention and which includes a thermoplastic resin and a mesophase pitch contains a thermoplastic resin, and 1 to 150 parts by mass of a mesophase pitch based on 100 parts by mass of the thermoplastic resin. The content of the mesophase pitch is more preferably 5 to 100 parts by mass. It is not preferable that the content of the mesophase pitch is more than 150 parts by mass because a resin composite fiber having a desired fiber diameter cannot be obtained, and it is not preferable that the content of the mesophase pitch is less than 1 part by mass because an intended carbon fiber cannot be manufactured at a low cost.

For manufacturing a carbon fiber having a fiber diameter of 1000 nm or less, the dispersion diameter of the mesophase pitch in the thermoplastic resin is preferably 0.01 to 50 μm, more preferably 0.01 to 30 μm. When the dispersion diameter of the mesophase pitch in the thermoplastic resin is out of the range of 0.01 to 50 μm, it may be difficult to manufacture a desired carbon fiber. In the mesophase pitch composition, the mesophase pitch forms a spherical or elliptical island phase. When the island phase has a spherical shape, the dispersion diameter in the present invention means a diameter thereof, and when the island phase is an elliptical shape, the dispersion diameter in the present invention means a major axis thereof.

The dispersion diameter of 0.01 to 50 μm is kept in the above-mentioned range preferably after the mesophase pitch composition is held at 300° C. for 3 minutes, more preferably after the mesophase pitch is held at 300° C. for 5 minutes, especially after the mesophase pitch is held at 300° C. for 10 minutes. In general, when a mesophase pitch composition is held in a molten state, the mesophase pitch is aggregated in the resin composition with time. When the mesophase pitch is aggregated, so that the dispersion diameter thereof exceeds 50 μm, it may be difficult to manufacture a desired carbon fiber. The aggregation rate of the mesophase pitch in the resin composition varies depending on the types of a thermoplastic resin to be used and the mesophase pitch.

The mesophase pitch composition can be manufactured by kneading the thermoplastic resin and the mesophase pitch in a molten state. Melt-kneading of the thermoplastic resin and the mesophase pitch can be carried out using a known apparatus. For example, at least one selected from the group consisting of a single-screw kneader, a twin-screw kneader, a mixing roll and a Banbury mixer can be used. For favorably micro-dispersing the mesophase pitch in the thermoplastic resin, it is preferable to use a twin-screw kneader, and particularly it is preferable to use a twin-screw kneader in which each shaft is rotated in the same direction, among the apparatuses described above.

While kneading temperature is not particularly limited as long as the thermoplastic resin and the mesophase pitch are in a molten state, the kneading temperature is preferably 100 to 400° C., more preferably 150 to 350° C. When the kneading temperature is lower than 100° C., the mesophase pitch is not brought into a molten state, and thus it is difficult to micro-disperse the mesophase pitch in the thermoplastic resin. On the other hand, when the kneading temperature is higher than 400° C., decomposition of the thermoplastic resin or mesophase pitch may progress. In addition, the melt-kneading time is preferably 0.5 to 20 minutes, more preferably 1 to 15 minutes. When the melt-kneading time is less than 0.5 minutes, it is difficult to micro-disperse the mesophase pitch in the thermoplastic resin. On the other hand, when the melt-kneading time is more than 20 minutes, the productivity of the carbon fiber is noticeably deteriorated.

Melt-kneading is carried out preferably under an inert atmosphere having an oxygen gas content of less than 10% by volume, more preferably under an inert atmosphere having an oxygen gas content of less than 5% by volume, especially preferably under an inert atmosphere having an oxygen gas content of less than 1% by volume. The mesophase pitch for use in the present invention may be denatured by reacting with oxygen during melt-kneading, leading to hindrance of micro-dispersion of the mesophase pitch in the thermoplastic resin. Thus, it is preferable to carry out melt-kneading under an inert atmosphere for suppressing a reaction between oxygen and the mesophase pitch.

Resin Composite Fiber

The method for manufacturing a resin composite fiber from the mesophase pitch composition is not limited as long as a desired carbon fiber can be prepared, and examples thereof may include a method in which a mesophase pitch composition is melt-spun using a spinning nozzle, and a method in which a mesophase pitch is melt-deposited using a rectangular nozzle.

For obtaining the carbon fiber of the present invention, an orientation control operation for improving the molecular orientation property of the mesophase pitch contained in the resin composite fiber in a stage of preparing the resin composite fiber is essential. In the orientation control operation, it is necessary to deform the mesophase pitch in a molten state for improving the molecular orientation property of the mesophase pitch in a molten state. Examples of the orientation control operation may include a method in which strain is applied to the mesophase pitch by shearing, and a method in which strain is applied to the mesophase pitch is by extension. Only one of these methods may be carried out, or both of these methods may be used in combination. In particular, the method in which strain is applied by extension is preferable because it has a great effect of improving the molecular orientation property.

Examples of the method for applying strain by shearing include a method in which the linear velocity of the mesophase pitch composition in a molten state is increased. Specifically, by increasing the passage speed of the mesophase pitch composition in a molten state in a channel of a spinning nozzle or rectangular nozzle, strain can be applied by shearing.

Examples of the method for applying strain by extension include a method in which the linear velocity of the mesophase pitch composition in a molten state is gradually increased as going toward the discharge side of a spinning nozzle or a rectangular nozzle. Specific examples thereof include a method in which the cross-sectional area of a channel of a nozzle is gradually reduced as going toward the discharge side (deformation inside the nozzle), and a method in which the mesophase pitch composition discharged from a discharge hole of a spinning nozzle or rectangular nozzle is taken up at a linear velocity higher than the discharge linear velocity (deformation outside the nozzle). In the case of deformation inside the nozzle, the mesophase pitch with the molecular orientation property improved by deformation is apt to have poor molecular orientation property as a result of thermal relaxation. On the other hand, in the case of deformation outside the nozzle, the mesophase pitch with the molecular orientation property improved by deformation is immediately cooled to reduce flowability thereof, so that the molecular orientation property of the mesophase pitch is retained. Thus, as the orientation control operation, a method is preferable in which strain is applied outside the nozzle by extension.

In these methods, it is important to control the shear strain rate and the extension strain rate.

Each of the shear strain rate and the extension strain rate is 5 to 10000 $s^{-1}$, preferably 100 to 1400 $s^{-1}$. When the strain rate is less than 5 $s^{-1}$, the molecular orientation property of the mesophase pitch cannot be sufficiently improved. When the strain rate is more than 10000 s$^{-1}$, deformation of the mesophase pitch cannot follow, and thus it is unable to deform the mesophase pitch in the form of a fiber.

The distance between the deformation start point and the deformation end point in the spinning nozzle or the rectangular nozzle is preferably 0.1 to 5 mm. The lower limit value of the distance is preferably 0.3 mm, more preferably 0.5 mm, still more preferably 0.7 mm, especially preferably 1.0 mm. The upper limit value of the distance is preferably 4.0 mm, more preferably 3.0 mm, most preferably 2.0 mm. Here, the distance between the deformation start point and the deformation end point in the nozzle refers to a length along a direction parallel to the axis center of a slit channel in a throttling portion formed in the nozzle. FIG. 1 is a sectional view showing an internal structure of a discharge port portion of the spinning nozzle. In FIG. 1, reference numeral 10 denotes a spinning nozzle, and reference numeral 15 denotes a slit channel. Reference numeral 11 denotes a point at which the size of the cross-section of the channel of the spinning nozzle starts to decrease, i.e. a deformation start point in the present invention. Reference numeral 13 denotes a point at which decrease of the size of the cross-section of the channel of the spinning nozzle is ended, i.e. a deformation end point in the present invention. The distance between the deformation start point and the deformation end point is a linear distance along a direction parallel to the axis center of a slit channel connecting the deformation start point 11 and the deformation end point 13. The introduction angle θ formed in the throttling portion of the spinning nozzle is 30 to 90 degrees, preferably 40 to 80 degrees, more preferably 45 to 75 degrees.

When a spinning nozzle having the above-mentioned shape is used, strain is moderately applied at the time when the mesophase pitch composition in a molten state passes through the channel of the spinning nozzle, so that the molecular orientation property of the mesophase pitch can be improved.

The distance between the deformation start point and the deformation end point outside the spinning nozzle is preferably 5 to 100 mm. The lower limit value of the distance is preferably 6 mm, more preferably 7 mm, especially preferably 8 mm. The upper limit value of the distance is preferably 90 mm, more preferably 80 mm, still more preferably 70 mm, especially preferably 60 mm, most preferably 50 mm. Here, the distance between the deformation start point and the deformation end point outside the nozzle means the shortest distance between the tip of the slit channel outlet of the spinning nozzle and the cast surface, and when a cooling drum is used, the distance between the deformation start point and the deformation end point outside the nozzle means the shortest distance between the tip of the slit channel outlet of the spinning nozzle and the moving surface of the cooling drum.

By performing control as described above, the molecular orientation property of the mesophase pitch can be improved, and a carbon fiber having a small coefficient of variation of the fiber diameter can be obtained.

The temperature in the operation for improving the molecular orientation property of the mesophase pitch is required to be higher than the melting temperature of the mesophase pitch, and is preferably 150 to 400° C., more preferably 180 to 350° C. When the temperature is higher than 400° C., the deformation relaxation rate of the mesophase pitch increases, so that it is difficult to maintain the shape of a fiber.

The draft ratio, which is a ratio of the discharge linear velocity and the take-up rate, is preferably 2 to 100, more preferably 2 to 50. It is not preferable that the draft ratio is more than 100 because deformation of the mesophase pitch cannot follow, and thus the mesophase pitch cannot be deformed into a fibrous shape. When the draft ratio is less than 2, the molecular orientation property of the mesophase pitch cannot be improved, and as a result, the crystallinity of the resulting fibrous carbon is reduced.

In addition, the step of fiber formation step of forming a resin composite fiber may include a cooling step. As the cooling step, mention is made of, for example, a method in which the atmosphere downstream of the spinning nozzle is cooled in the case of melt spinning. In the case of melt deposition, mention is made of a method in which a cooling drum is provided downstream of the rectangular nozzle. By providing the cooling step, a region where the mesophase pitch is deformed by extension can be adjusted, and the rate of strain can be adjusted. In addition, by providing the cooling step, the resin composite fiber after spinning or deposition is immediately cooled and solidified to enable stable molding.

Resin Composite Stabilized Fiber

From the resin composite fiber obtained as described above, a resin composite stabilized fiber is prepared by stabilizing (also referred to as "infusibilizing") a mesophase pitch fiber contained in the resin composite fiber. The stabilization can be carried out by a known method such as a gas flow treatment using air, oxygen, ozone, nitrogen dioxide, a halogen or the like, and a solution treatment using an acidic aqueous solution or the like. Infusibilization by a gas flow treatment is preferable from the viewpoint of productivity.

As a gas component to be used, air, oxygen, or a mixed gas containing air and oxygen is preferable from the viewpoint of ease of handling, and use of air is especially preferable from the viewpoint of cost. The concentration of an oxygen gas to be used is preferably in a range of 10 to 100% by volume based on the total gas composition. When the oxygen gas concentration is less than 10% by volume based on the total gas composition, a considerably large amount of time is required to stabilize the mesophase pitch contained in the resin composite fiber.

The reaction temperature for stabilization is preferably 50 to 350° C., more preferably 60 to 300° C., still more preferably 100 to 300° C., especially preferably 200 to 300° C. The treatment time for stabilization is preferably 10 to 1200 minutes, more preferably 10 to 600 minutes, still more preferably 30 to 300 minutes, especially preferably 60 to 210 minutes.

The softening point of the mesophase pitch is markedly increased by the stabilization treatment. In view of the purpose of obtaining a desired carbon fiber, the softening point of the mesophase pitch is preferably 400° C. or higher, more preferably 500° C. or higher.

Thermoplastic Resin Removing Step

Next, the thermoplastic resin contained in the resin composite stabilized fiber obtained as described above is removed to separate the stabilized fiber. In this stop, the thermoplastic resin is decomposed and removed while thermal decomposition of the stabilizing fiber is suppressed. Examples of the method for decomposing and removing the thermoplastic resin include a method in which the thermoplastic resin is removed using a solvent, and a method in which the thermoplastic resin is thermally decomposed to be removed.

Preferably, thermal decomposition of the thermoplastic resin is carried out under an inert gas atmosphere. The inert gas atmosphere mentioned here means a gas atmosphere of carbon dioxide, nitrogen, argon or the like. The oxygen concentration thereof is preferably 30 ppm by volume or less, more preferably 20 ppm by volume or less. As the inert gas to be used in this step, carbon dioxide and nitrogen are preferably used, and nitrogen is especially preferably used from the viewpoint of cost.

Thermal decomposition of the thermoplastic resin can also be carried out under a reduced pressure. By carrying out thermal decomposition under a reduced pressure, the thermoplastic resin can be sufficiently removed. As a result, a carbon fiber or a graphitized fiber obtained by carbonizing or graphitizing the stabilized fiber is capable of reducing fusion between fibers. The atmospheric pressure is preferably as low as possible, and is preferably 50 kPa or less, more preferably 30 kPa or less, still more preferably 10 kPa or less, especially preferably 5 kPa or less. On the other hand, since it is difficult to achieve perfect vacuum, the lower limit of the pressure is generally 0.01 kPa or more.

When thermal decomposition of the thermoplastic resin is carried out under a reduced pressure, a very small amount of oxygen and an inert gas may be present as long as the atmosphere pressure is maintained. Particularly, it is preferable that a very small amount of an inert gas is present because fusion between fibers due to thermal deterioration of the thermoplastic resin is suppressed. A very small amount of oxygen as mentioned here means that the oxygen concentration is 30 ppm by volume or less, and a very small amount of an inert gas as mentioned here means that the inert gas concentration is 20 ppm by volume or less. The type of inert gas to be used is as described above.

The thermal decomposition temperature is preferably 350 to 600° C., more preferably 380 to 550° C. When the thermal decomposition temperature is lower than 350° C., thermal decomposition of the stabilized fiber can be suppressed, but it may be unable to sufficiently perform thermal decomposition of the thermoplastic resin. On the other hand, when the thermal decomposition temperature is higher than 600° C., thermal decomposition of the thermoplastic resin can be sufficiently performed, but the stabilized fiber may be thermally decomposed, and as a result, the yield is easily reduced. The thermal decomposition time is preferably 0.1 to 10 hours, more preferably 0.5 to 10 hours.

In the manufacturing method of the present invention, it is preferable that the stabilization step and the thermoplastic resin removing step are carried out with the resin composite fiber or resin composite stabilized fiber held on a support base material in a basis weight of 2 kg/m$^2$ or less. By holding on the support base material, it is possible to suppress the aggregation of the resin composite fiber or the resin composite stabilized fiber caused by the heat treatment at the time of the stabilization treatment or removal of the thermoplastic resin, and to maintain the air permeability is possible.

A material that is not deformed or corroded by a solvent or heating is required as the material of the support base material. In addition, the heat-resistant temperature of the support base material is preferably 600° C. or higher because the support base material should not be deformed at a thermal decomposition temperature in the thermoplastic resin removing step. Examples of the material that meets such a requirement may include metallic materials such as stainless steel, and ceramic materials such as alumina and silica.

The shape of the support base material is preferably a shape having air permeability in a direction perpendicular to the surface. A mesh structure is preferable as such a shape. The aperture of the mesh is preferably 0.1 to 5 mm. When the aperture is more than 5 mm, fibers may be easily aggregated on the mesh line by a heating treatment, leading to insufficient stabilization of the mesophase pitch and removal of the thermoplastic resin. On the other hand, when the aperture of the mesh is less than 0.1 mm, the permeability of the support base material may be reduced due to a decrease in porosity of the support base material.

Carbonization and Firing Step

By carbonizing and/or graphitizing the stabilized fiber under an inert atmosphere, the carbon fiber of the present invention is obtained. As a container to be used here, a crucible-like container made of graphite is preferable. Here, the carbonization refers to heating at a relatively low temperature (preferably about 1000° C.), and the graphitization refers to growth of graphite crystals by heating at a higher temperature (preferably about 3000° C.).

Examples of the inert gas to be used for carbonization and/or graphitization of the stabilized fiber include nitrogen and argon. The concentration of oxygen in the inert atmosphere is preferably 20 ppm by volume or less, more preferably 10 ppm by volume or less. The heating temperature during carbonization and/or graphitization is preferably 500 to 3500° C., more preferably 800 to 3200° C. In particular, the temperature during graphitization is preferably 2000 to 3200° C., more preferably 2100 to 3000° C. When the temperature during graphitization is lower than 2000° C., crystal growth may be hindered to the extent that the crystallite length is insufficient, leading to marked deterioration of electroconductivity. In addition, a graphitization temperature of higher than 3000° C. is preferable in terms of crystal growth, but tends to reduce the oxygen content of the carbon fiber. The firing time is preferably 0.1 to 24 hours, more preferably 0.2 to 10 hours.

Grinding Treatment

The method for manufacturing the carbon fiber of the present invention may include a grinding treatment step. Preferably, the grinding treatment is carried out in the thermoplastic resin removing step and/or the carbonization and firing step. In the grinding method, it is preferable to use a fine grinder such as a jet mill, a ball mill, a bead mill, an impeller mill or a cutter mill, and after grinding, classification may be carried out as necessary. In the case of wet grinding, a dispersion medium is removed after grinding, but if marked secondary aggregation occurs here, subsequent handling is very difficult. In this case, it is preferable to carry out a crushing operation using a ball mill, a jet mill or the like after drying.

2. Electrode Mixture Layer for Nonaqueous Secondary Battery

A second aspect of the present invention is an electrode mixture layer for a nonaqueous electrolyte secondary battery (hereinafter, also referred to simply as an "electrode mixture layer") which is formed using the fibrous carbon. The electrode mixture layer contains at least an electrode active material, and the fibrous carbon of the present invention. The foregoing fibrous carbon of the present invention may contain two or more fibers different in, for example, average fiber diameter and average fiber length. The electrode mixture layer of the present invention may further contain other carbon-based electroconductive aid and a binder.

The thickness of the electrode mixture layer of the present invention is not particularly limited, but it is preferably 50 to 5000 μm, more preferably 50 to 1000 μm. When the thickness is less than 50 μm, a large amount of a separator or current collector is used in the case where a cell with a high capacity is manufactured, and in this case, the volume occupancy of the electrode active material in the cell decreases. This is not preferable from the viewpoint of an energy density, and thus applications are considerably restricted. When the thickness is more than 5000 μm, cracks are easily generated in the electrode mixture layer, so that it is relatively difficult to manufacture the electrode mixture layer. The thickness of the electrode mixture layer in the present invention means a thickness that does not include the later-described current collector, i.e. a thickness of only the electrode mixture layer. The method for measuring the thickness of the electrode mixture layer is not particularly limited, and the thickness of the electrode mixture layer can be measured using, for example, a micrometer.

As a nonaqueous electrolyte secondary battery that is manufactured using the electrode mixture layer of the present invention, mention is made of a lithium ion secondary battery as a typical battery. Hereinafter, a positive active material and a negative active material that are used in the lithium ion secondary battery will be described.

Positive Active Material

As the positive active material contained in the electrode mixture layer of the present invention, a positive active material known in a nonaqueous electrolyte secondary battery can be used. For example, in the case of a lithium ion secondary battery, a lithium-containing metal oxide capable of absorbing and releasing lithium ions is suitable. Examples of the lithium-containing metal oxide may include composite oxides containing lithium and at least one element selected from the group consisting of Co, Mg, Mn, Ni, Fe, Al, Mo, V, W, Ti and the like.

Specific examples of the metal oxide include $Li_xCoO_2$, $Li_xNiO_2$, $Li_xMnO_2$, $Li_xCo_aNi_{1-a}O_2$, $Li_xCo_bV_{1-b}O_z$, $Li_xCo_bFe_{1-b}O_2$, $Li_xMn_2O_4$, $Li_xMn_cCo_{2-c}O_4$, $Li_xMn_cNi_{2-c}O_4$, $Li_xMn_cV_{2-c}O_4$ and $Li_xMn_cFe_{2-c}O_4$, (where x=0.02 to 1.2, a=0.1 to 0.9, b=0.8 to 0.98, c=1.2 to 1.96 and z=2.01 to 2.3). Examples of the preferred lithium-containing metal oxides include $Li_xCoO_2$, $Li_xNiO_2$, $Li_xMnO_2$, $Li_xCo_aNi_{1-a}O_2$, $Li_xMn_2O_4$ and $Li_xCo_bV_{1-b}O_z$ (where x, a, b and z are the same as described above). The value of x is a value before the start of charge-discharge, and increases or decreases depending on charge-discharge. The positive active materials may be used alone, or used in combination of two or more thereof.

The average particle diameter of the positive active material is preferably 10 μm or less, more preferably 0.05 to 7 μm, still more preferably 1 to 7 μm. When the average particle diameter is more than 10 μm, the efficiency of charge-discharge reaction under a large current may be reduced.

The content of the positive active material in the electrode mixture layer of the present invention is preferably 60% by mass or more, more preferably from 70 to 98.5% by mass, still more preferably from 75 to 98.5% by mass. When the content of the positive active material in the electrode mixture layer is less than 60% by mass, use in power supply applications requiring a high energy density may be difficult. When the content of the positive active material in the electrode mixture layer is more than 98.5% by mass, the binder amount may be excessively small, resulting in generation of cracks in the electrode mixture layer, or the electrode mixture layer may be peeled from the current collector. Further, the content of the fibrous carbon and carbon-based electroconductive aid may be excessively small, leading to insufficient electroconductivity of the electrode mixture layer.

Negative Active Material

As the negative active material contained in the electrode mixture layer of the present invention, a negative active material known in a nonaqueous electrolyte secondary battery can be used. For example, a carbon material which is a material capable of absorbing and releasing lithium ions; an alloy or oxide containing Si and/or Sn; or the like can be used. In particular, a carbon material is preferable from the viewpoint of cost. Examples of the carbon material include natural graphite, artificial graphite manufactured by heat-treating natural petroleum-based coke or coal-based coke, hard carbon obtained by carbonizing a resin, and mesophase pitch-based carbon materials.

When natural graphite or artificial graphite is used, graphite in which the (002) lattice spacing d (002) is in a range of 0.335 to 0.337 nm as measured by a powder X-ray diffraction method is preferable for increasing the battery capacity. The natural graphite refers to graphitic materials that are naturally produced as an ore. The natural graphite is classified into two types according to an appearance and properties thereof. One type of natural graphite is scaly graphite having a high crystallinity degree, and the other type of natural graphite is earthy graphite having a low crystallinity degree. The scaly graphite is further classified into scalelike graphite having a leaf-like appearance and massive scaly graphite. The locality, properties and type of natural graphite are not particularly limited. In addition, natural graphite, or particles manufactured with natural graphite as a raw material may be heat-treated, and used.

The artificial graphite refers to graphitic materials close to graphite and perfect crystals of graphite which are artificially prepared by a wide range of techniques. For example, the artificial graphite can be manufactured in the following manner: tar or coke obtained from residues by dry distillation, distillation of crude oil, or the like is fired at about 500 to 1000° C., and then graphitized at 2000° C. or higher. In addition, quiche graphite obtained by reprecipitating carbon from dissolved iron is one type of artificial graphite.

When as a negative active material, an alloy containing Si and/or Sn is used in addition to a carbon material, the expansion coefficient of the electrode during charge-discharge is reduced, and cycle characteristics are improved as compared to a case where Si and/or Sn are used alone, or each oxide is used. Particularly, a Si-based alloy is preferable. Examples of the Si-based alloy include alloys of Si and at least one element selected from the group consisting of B, Mg, Ca, Ti, Fe, Co, Mo, Cr, V, W, Ni, Mn, Zn, Cu and the like. Specific examples thereof include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $VSi_2$, $WSi_2$ and $ZnSi_2$. The negative active materials may be used alone, or used in combination of two or more thereof.

The average particle diameter of the negative active material is 10 μm or less. When the average particle diameter is more than 10 μm, the efficiency of the charge-discharge reaction under a large current is reduced. The average particle diameter is preferably 0.1 to 10 μm, more preferably 1 to 7 μm.

Binder

As a binder to be used in the electrode mixture layer of the present invention, a previously known binder which is capable of forming an electrode and has sufficient electrochemical stability can be used. Examples of the binder include polyvinyl alcohol, polyacrylic acid, carboxymethyl cellulose, polytetrafluoroethylene (PTFE), polyvinylidene fluoride (PVDF), styrene butadiene rubber (SBR), fluoroolefin copolymer crosslinked polymers, polyimide, polyamideimide, aramid and phenol resins. Particularly, polyvinylidene fluoride (PVDF) is preferable. The binders may be used alone, or used in combination of two or more thereof. The form of the binder is not particularly limited, and may be a solid form or a liquid form (e.g. an emulsion). The binder can be appropriately selected in consideration of a method for manufacturing an electrode (particularly, dry kneading or wet kneading), solubility in an electrolytic solution, and the like.

The content of the binder in the electrode mixture layer of the present invention is preferably 1 to 25% by mass, more preferably 3 to 20% by mass, still more preferably 5 to 20% by mass. When the content of the binder is more than 25% by mass, the amount of the active material in the electrode decreases, so that the energy density of the resulting battery is easily reduced.

Carbon-Based Electroconductive Aid Other than Fibrous Carbon of the Present Invention The electrode mixture layer of the present invention may contain a carbon-based electroconductive aid in addition to the fibrous carbon of the present invention. Examples of the carbon-based electroconductive aid contained in addition to the fibrous carbon of the present invention may include carbon black, acetylene black, carbon nanotubes, VGCF, scalelike carbon, graphene and graphite. These carbon-based electroconductive aids may be used alone, or used in combination of two or more thereof.

The carbon-based electroconductive aid has an average particle size of preferably 10 to 200 nm, more preferably 20 to 100 nm. The content of the carbon-based electroconductive aid contained in addition to the fibrous carbon in the electrode mixture layer of the present invention is preferably 0.5 to 5% by mass, more preferably 0.5 to 4% by mass, still more preferably 1 to 3% by mass.

3. Electrode for Nonaqueous Electrolyte Secondary Battery

A third aspect of the present invention is an electrode for a nonaqueous electrolyte secondary battery (hereinafter, also referred to simply as an "electrode") which is provided with the electrode mixture layer. In this electrode, the electrode mixture layer of the present invention is formed on at least one surface of a current collector.

General methods for manufacturing an electrode including the electrode mixture layer of the present invention include the following two methods. In one method, the electrode active material, the fibrous carbon, and a binder and other components as necessary are mixed and kneaded, and extrusion-molded into a film, and the film is rolled and drawn, and then bonded to a current collector.

In another method, the electrode active material, the fibrous carbon, a binder, a solvent that dissolves the binder, and other components are mixed to prepare a slurry, the slurry is applied to the surface of the current collector, a solvent is removed, and pressing is then performed.

In the present invention, either of the methods can be employed, but the latter method is more preferable, and therefore the latter method will be described in detail below.

The solid concentration (i.e. the ratio of the total mass of components other than a solvent of the slurry to the total mass of the slurry) in the slurry is preferably 10 to 30% by mass, more preferably 15 to 25% by mass. When the solid concentration is more than 30% by mass, it may be difficult to prepare a uniform slurry. When the solid concentration is less than 10% by mass, the viscosity of the slurry is insufficient, so that the electrode mixture layer laminated on the current collector may have an uneven thickness.

The solvent that is used in the slurry is not particularly limited, and examples thereof include N-methylpyrrolidone (NMP), dimethylacetamide (DMAc), dimethyl formamide (DMF) and dimethylsulfoxide (DMSO). Particularly, NMP or DMAc is preferable. The solvents may be used alone, or used in combination of two or more thereof.

When the thixotropy in the slurry is excessively high in preparation of the electrode, it may be difficult to secure flowability that is suitable for coating. In this case, a slurry formation aid may be used. By adding a slurry formation aid, sufficient flowability can be secured even with a small amount of a solvent, and the dispersibility of the carbon-based electroconductive aid is considerably improved. In addition, generation of cracks after removal of the solvent can be suppressed. Examples of the slurry formation aid include polyvinyl pyrrolidone, carboxymethyl cellulose, polyvinyl acetate and polyvinyl alcohol. In particular, polyvinylpyrrolidone is preferable. The slurry formation aids may be used alone, or used in combination of two or more thereof. The addition amount of the slurry formation aid is preferably 10% by mass or less, more preferably 0.5 to 10% by mass, still more preferably 0.5 to 8% by mass based on the total amount of components other than the solvent in the slurry. When the addition amount of the slurry formation aid is more than 10% by mass, the slurry viscosity may sharply decreases, resulting in poor dispersion which makes it difficult to prepare a suitable slurry. When the addition amount of the slurry formation aid is less than 0.5% by mass, the effect of the slurry formation aid is hardly exhibited.

The slurry is applied to the surface of the later-described current collector. As a coating method, a known coating method using a doctor blade or the like can be employed. After application of the slurry, the solvent is removed by, for example, performing a heating treatment at 60 to 100° C., preferably at 75 to 85° C. preferably for 60 to 180 minutes. Thereafter, the electrode of the present invention can be manufactured by pressing the coated product after removal of the solvent. As preferred pressing conditions, pressing is performed for 1 to 5 minutes under a pressure of 10 to 30 Pa.

For the current collector that forms the electrode, any electroconductive material can be used. For example, a metallic material of aluminum, nickel, iron, stainless steel, titanium or copper can be used. In particular, aluminum, stainless steel or copper is preferable, and use of aluminum or carbon-coated aluminum is more preferable.

The thickness of the current collector is preferably 10 to 50 μm.

4. Nonaqueous Electrolyte Secondary Battery

A fourth aspect of the present invention is a nonaqueous electrolyte secondary battery including the electrode of the present invention.

The nonaqueous electrolyte secondary battery of the present invention is formed using the electrode of the present invention as a positive electrode and/or a negative electrode, and using a known separator and electrolytic solution. As the nonaqueous electrolyte secondary battery, a lithium ion secondary battery is exemplified.

The nonaqueous electrolyte secondary battery of the present invention includes a positive electrode with a positive electrode mixture layer formed on the surface of the current collector, an electrolyte layer containing an electrolyte, and a negative electrode with a negative electrode mixture layer formed on the surface of a current collector. The positive electrode mixture layer of the positive electrode and the negative electrode mixture layer of the negative electrode face each other, and the electrolyte layer is laminated so as to be inserted between the positive electrode mixture layer and the negative electrode mixture layer.

The cell shape of the nonaqueous electrolyte secondary battery of the present invention is not particularly limited, and the nonaqueous electrolyte secondary battery can be provided in any cell shape. Specific examples thereof may include cell shapes such as a button shape, a cylindrical shape and a square shape. It is also preferable that the nonaqueous electrolyte secondary battery has an internal configuration in which a plurality of pairs of positive and negative electrodes and a separator are laminated. Here, it is possible to employ a known system of stack lamination type, winding type, folding lamination type or the like. Examples of the exterior material of the nonaqueous electrolyte secondary battery of the present invention may include metallic cans and aluminum laminate resin films. In the nonaqueous electrolyte secondary battery of the present invention, a predetermined fibrous carbon added to the electrode mixture layer has a linear structure and high electroconductivity, and therefore an electroconductive path is easily formed, so that an excellent charge-discharge characteristic can be obtained. Further, the electrode strength is improved.

Electrolyte Layer

For the electrolyte layer that forms the nonaqueous electrolyte secondary battery, a nonaqueous electrolytic solution with an electrolyte such as a lithium salt dissolved in a nonaqueous solvent is used.

The electroconductivity of the electrolytic solution to be used in the nonaqueous electrolyte secondary battery of the present invention is preferably $1 \times 10^{-2}$ S/cm or more at 25° C.

In general, the nonaqueous electrolytic solution is characterized by having higher voltage resistance and attaining a higher energy density as compared to an aqueous electrolytic solution. The nonaqueous solvent is not limited, and a known nonaqueous solvent can be used. Specific examples thereof include propylene carbonate, ethylene carbonate, diethyl carbonate, dimethyl carbonate, methylethyl carbonate, dimethoxyethane, γ-butyrolactone, γ-valerolactone, acetonitrile, nitromethane, methoxyacetonitrile, nitroethane, N, N-dimethylformamide, 3-methoxypropionitrile, N-methylpyrrolidone, N,N'-dimethylimidazolidinone, dimethylsulfoxide, sulfolane, 3-methylsulfolane and ethylmethyl carbonate. These nonaqueous solvents may be used alone, or used in combination of two or more thereof. It is important that the solvent to be used in the electrolytic solution has an appropriate boiling point, melting point, viscosity and specific dielectric constant, and among the above-mentioned solvents, those mainly containing propylene carbonate or γ-butyrolactone are preferably used.

Examples of the electrolyte to be used in the nonaqueous electrolyte secondary battery of the present invention include $LiClO_4$, $LiBF_4$, $LiPF_6$, $LiAlCl_4$, $LiSbF_6$, LiSCN, $LiCF_3SO_3$, $LiCF_3CO_2$, $LiAsF_6$, lower aliphatic lithium carboxylate, LiCl, LiBr, LiI, chloroborane lithium, borates and imide salts. Examples of the borate include lithium bis(1,2-benzenediolate (2-)—O,O')borate, lithium bis(2,3-naphthalenediolate(2-)—O,O')borate, lithium bis(2,2'-biphenyldiolate(2-)—O,O')borate and lithium (5-fluoro-2-oleate-1-benzenesulfonic acid-O,O')borate. Examples of imide salt include bis-trifluoromethanesulfonic acid imide lithium $((CF_3SO_2)_2NLi)$, trifluoromethanesulfonic acid nonafluorobutanesulfonic acid imide lithium (LiN $(CF_3SO_2)$ $(C_4F_9SO_2)$) and bis-pentafluoroethanesulfonic acid imide lithium $(C_2F_5SO_2)_2NLi)$. The concentration of the electrolyte is preferably 0.5 to 2 mol/L. The electrolytes may be used alone, or used in combination of two or more thereof. A known additive may be added to the electrolyte for the purpose of, for example, improving cycle stability and charge-discharge efficiency.

As the electrolytic solution to be used in the lithium ion secondary battery of the present invention, an ionic liquid typified by an ethyl methyl imidazolium salt can also be suitably used. Here, it is not necessarily required to dissolve the salt in the nonaqueous solvent.

Separator

When a nonaqueous electrolytic solution as described above is used, a separator is generally used in order to prevent the negative electrode mixture layer and the positive electrode mixture layer from coming into direct contact with each other. As the shape of the separator, a known shape such as a paper shape (film shape) or a porous film shape can be suitably employed. Examples of the material of the separator include cellulose, aromatic polyamide, aliphatic polyimide, polyolefins. Teflon (registered trademark) and polyphenylene sulfide. Among them, cellulose papers, and porous films of aromatic polyamide or aliphatic polyimide are preferable from the viewpoint of heat resistance and thickness reduction. The separators may be used alone, or used in combination of two or more thereof. The thickness of the separator is preferably about 20 to 100 μm for preventing a short-circuit, but in the present invention, it is also possible to use a separator with a thickness of about 5 to 20 μm, which is sufficiently thin as compared to a conventional separator. When a thin separator is used, internal resistance derived from the separator is reduced, so the power is improved, and the energy density of the cell is also improved.

EXAMPLES

Hereinafter, the present invention will be described further in detail by way of examples, but the present invention is not limited to these examples. Various kinds of measurements and analyses in examples were performed in accordance with the following methods, respectively.

(1) Examination of Shape of Fibrous Carbon Etc.

Observation and photographing were performed using a desk-top electron microscope (manufactured by JEOL Ltd., model: NeoScope JCM-6000). The average fiber diameter of fibrous carbon etc. was determined by measuring the fiber diameters at 300 spots randomly selected in an electron micrograph, and calculating the average value of all the measurement results thereof (n=300). The average effective fiber length was calculated in the same manner as described above.

(2) X Ray Diffraction Measurement of Fibrous Carbon Etc.

In X-ray diffraction measurement, the lattice spacing (d 002) and the crystallite size (La, Lc) were measured in accordance with the JIS R 7651 method using RINT-2100 manufactured by Rigaku Corporation.

(3) Method for Measuring Volume Resistivity

The volume resistivity was measured with a four-probe-type electrode unit under a load of 0.25 to 2.50 kN using a powder resistance system (MCP-PD51) manufactured by Dia Instruments Co., Ltd. The volume resistivity was defined as a volume resistivity value at a packing density of 0.4 g/cm$^3$ from a relationship diagram of a volume resistivity with a change in packing density (FIG. 6).

(4) Calculation of Shear Rate

While the shear rate inside a nozzle varies depending on a position in the nozzle, and is not constant, the shear rate was calculated as an apparent shear rate from the following formula (2) in the case of a circular nozzle, and from the following formula (3) in the case of a rectangular nozzle.

(I) Circular Nozzle

[Mathematical Formula 2]

$$v = \frac{4Q}{\pi R^3}$$  Formula (2)

v: shear rate
Q: outflow
R: circular tube radius (II) Rectangular Nozzle

[Mathematical Formula 3]

$$v = \frac{6Q}{BH^2}$$  Formula (3)

v: shear rate
Q: outflow
B: slit length
H: slit width (5) Calculation of Extension Strain Rate While the extension strain rate inside the nozzle and the extension strain rate outside the nozzle are not constant, the extension strain rate was calculated from the following formula (4) assuming that deformation proceeds at a constant extension strain rate until the end of deformation after the start of deformation.

[Mathematical Formula 4]

$$\varepsilon = \frac{(v_T - v_0)(v_T + v_0)}{2L_T v_0}$$  Formula (4)

ε: extension strain rate
$L_T$: distance to end of deformation
$v_T$: post-deformation rate determined from outflow and cross-sectional area
$v_0$: pre-deformation rate determined from outflow and cross-sectional area Example 1

Manufacturing of Mesophase Pitch

A coal tar pitch freed of a quinoline-insoluble component and having a softening point of 80° C. was hydrogenated in the presence of a Ni—Mo based catalyst at a pressure of 13 MPa and a temperature of 340° C. to obtain a hydrogenated coal tar pitch. The hydrogenated coal tar pitch was heat-treated at 480° C. under atmospheric pressure, and then decompressed to remove a low-boiling-point component, so that a crude mesophase pitch was obtained. Using a filter, the crude mesophase pitch was filtered at a temperature of 340° C. to remove foreign matters, whereby a purified mesophase pitch was obtained.

Manufacturing of Ultrafine Fibrous Carbon (CNF-1)

84 parts by mass of linear low-density polyethylene (EVOLUE (registered trademark) SP 1510, manufactured by Prime Polymer Co., Ltd., MFR=1 g/10 min) as a thermoplastic resin and 16 parts by mass of a mesophase pitch (90.9%, softening point 303.5° C.) manufactured by the above-mentioned method, as a thermoplastic carbon precursor, were melt-kneaded in a co-rotating twin-screw extruder ("TEM-26SS" manufactured by TOSHIBA MACHINE CO., LTD., at a barrel temperature of 300° C. under a nitrogen gas stream) to prepare a mesophase pitch composition.

A resin composite fiber (sea-island-type composite fiber having a mesophase pitch fiber as an island components) having a fiber diameter of 100 μm was then prepared by spinning the mesophase pitch composition by a melt-spinner using a circular nozzle having a diameter of 0.2 mm and an introduction angle of 60°. The nozzle temperature was 340° C., the discharge amount was 3.8 g/nozzle/hour, the shear rate was 1360 s$^{-1}$, and the draft ratio as a ratio of the discharge linear velocity and the take-up rate was 4. Under the conditions, the extension strain rate inside the nozzle was 982 s$^{-1}$, the deformation range outside the nozzle was 10 mm under the nozzle, and the extension strain rate was 9 s$^{-1}$.

By holding the resin composite fiber under an oxidizing gas atmosphere, the mesophase pitch was stabilized to obtain a resin composite stabilized fiber.

Next, the thermoplastic resin was removed from the resin composite stabilized fiber to obtain a stabilized fiber.

The resulting stabilized fiber was added to a mixed solvent of ethanol/ion-exchanged water (volume ratio=1/1)

and, the mixture was ground by a mixer to be dispersed. The resulting dispersion liquid was filtered.

The resulting stabilized fiber was heated to 1000° C. from room temperature at a rate of 5° C./min under nitrogen at a flow rate of 1 L/min, and held for 30 minutes after the temperature reached 1000° C., so that the stabilized fiber was carbonized. Further, the temperature was elevated from room temperature to 3000° C. over 3 hours under an argon gas atmosphere to prepare an ultrafine fibrous carbon. The resulting ultrafine fibrous carbon was subjected to a crushing treatment using a dry jet mill.

The resulting ultrafine fibrous carbon had an average fiber diameter (corresponding to the average length of the smallest dimension) of 250 nm, and had no branched structure. The average effective fiber length was 15.1 μm. In addition, the average lattice spacing d002 of the (002) surface as measured by an X-ray diffraction method was 0.3372 nm, the crystallite length (La110) was 111 nm, and the thickness (Lc002) of a layered planar structure was 62 nm. Thus, the fibrous carbon had high crystallinity. The metal content in the ultrafine fibrous carbon was 30 ppm (10 ppm for iron and 20 ppm for sodium).

An electrode having an electrode mixture layer thickness of 114 μm and an electrode density of 2.56 g/cm$^3$ was prepared using 2 parts by mass of the ultrafine fibrous carbon (CNF-1), and 91 parts by mass of a positive active material (LiFePO$_4$: manufactured by Hohsen Corp., SLFP-ES01), 7 parts by mass of polyvinylidene fluoride (manufactured by KUREHA CORPORATION, W #7200) as a binder. The electrode had a small volume resistance of 83 Ωcm, and was excellent in electroconductivity. In addition, as described below, the ratio of an integrated value of reduction currents to an integrated value of oxidation currents was 0.9, and thus a reversible electrochemical reaction was generated. The ratio of IA/IB was 0, and an electrochemical reaction was not generated in a potential range of 2.5 to 4.4 V (vs. Li/Li+). An excellent charge-discharge characteristic of 65% was exhibited.

Cyclic Voltammetry Measurement

A slurry was prepared using 50 parts by mass of an ultrafine fibrous carbon (CNF-1) as a carbon-based electroconductive aid, 50 parts by mass of polyvinylidene fluoride (manufactured by KUREHA CORPORATION, W #7200W) as a binder, and N-methylpyrrolidone as a solvent. The prepared slurry was applied to a current collector (15 μm-thick aluminum foil), and then dried at 120° C. for 3 hours to prepare a model electrode for cyclic voltammetry measurement. The thickness of an electrode mixture layer formed on the model electrode was 17 μm.

A bipolar cell (coin battery) with a lithium metal as a counter electrode was prepared using model electrode as a working electrode. As an electrolytic solution, an electrolytic solution including a mixed solution of ethylene carbonate/ethyl methyl carbonate (volume ratio: 3/7, manufactured by Kishida Chemical Co., Ltd.) containing LiPF$_6$ in a concentration of 1 mol/L was used. As a separator, a glass fiber nonwoven fabric was used.

FIG. 2 shows a cyclic voltammetry (CV) curve measured in a potential range of 2.5 to 5 V (vs. Li/Li+). This curve shows that the ratio of an integrated value of reduction currents to an integrated value of oxidation currents was 0.9. That is, a reversible electrochemical reaction was generated. In addition. FIG. 3 shows a CV curve measured in a potential range of 2.5 to 4.4 V (vs. Li/Li+). FIG. 2 and FIG. 3 show that the ratio of IA/IB was 0. That is, an electrochemical reaction was not generated in a potential range of 2.5 to 4.4 V (vs. Li/Li+).

Accordingly, there can be provided a nonaqueous electrolyte secondary battery in which side reactions such as decomposition of an electrolytic solution and a reaction of an electroconductive aid with the electrolytic solution hardly occur under a high voltage.

Charge-Discharge Measurement

Charge-discharge measurement was performed by a charge-discharge apparatus (HJ-1005 SD 8 manufactured by HOKUTO DENKO CORP.) using the bipolar cell. As charge-discharge conditions, the cell was charged at a constant current of 0.1 mA/cm$^2$ to 5.0 V, and then discharged at a constant current of 0.1 mA/cm$^2$ to 2.5 V. The measurement results are shown in FIG. 4. Good results were obtained with the charge capacity being 22.7 mAh/g, the discharge capacity being 14.7 mAh/g and the charge-discharge efficiency being 65%.

Example 2

Manufacturing of Ultrafine Fibrous Carbon (CHF-2)

90 parts by mass of high-density polyethylene (manufactured by Prime Polymer Co., Ltd., HI-ZEX 5000 SR, melt viscosity: 14 Pa·s at 350° C. and 600 s$^{-1}$, MFR=0.37 g/10 min) as a thermoplastic resin and 10 parts by mass of Mesophase Pitch AR-MPH (manufactured by Mitsubishi Gas Chemical Company, Inc.) as a mesophase pitch were melt-kneaded in a co-rotating twin-screw extruder ("TEM-26SS" manufactured by TOSHIBA MACHINE CO., LTD., at a barrel temperature of 310° C. under a nitrogen gas stream) to prepare a mesophase pitch composition. The dispersion diameter of the mesophase pitch in the thermoplastic resin was 0.05 to 2 μm. In addition, this mesophase pitch composition was held at 300° C. for 10 minutes, but the mesophase pitch was not aggregated, and the dispersion diameter was 0.05 to 2 μm.

The mesophase pitch composition was then molded into a 60 μm-thick planar body using a rectangular nozzle having a slit width of 0.2 mm, a slit length of 100 mm and an introduction angle of 60°. The nozzle temperature was 340° C., the discharge amount was 2.4 kg/hour, the shear rate was 1000 s$^{-1}$, the draft ratio as a ratio of the discharge linear velocity and the take-up rate was 25, and the distance between the discharge port and the cooling drum was 50 mm. Under the conditions, the extension strain rate inside the nozzle was 95 s$^{-1}$, and the extension strain rate outside the nozzle was 208 s$^{-1}$. The resulting planar body was disposed in a nonwoven fabric form on a wire gauze having an opening of 1.46 mm and a wire diameter of 0.35 mm in such a manner that the basis weight of staple fibers was 30 g/m$^2$.

The nonwoven fabric including the resin composite fiber was held in a hot air dryer at 215° C. for 3 hours to prepare a nonwoven fabric including a resin composite stabilized fiber. Next, the nonwoven fabric was placed in a vacuum gas purging furnace, the inside of the furnace was purged with nitrogen, then decompressed to 1 kPa, and heated in this state to remove the thermoplastic resin. As heating conditions, the temperature was elevated to 500° C. at a temperature elevation rate of 5° C./min, and then kept at the same temperature for 60 minutes.

The nonwoven fabric freed of the thermoplastic resin was added in an ethanol solvent, and vibrations were applied by an ultrasonic oscillator for 30 minutes to disperse the stabilized fiber in the solvent. The stabilized fiber dispersed in the solvent was filtered to prepare a nonwoven fabric with a stabilized fiber dispersed therein.

The nonwoven fabric with a stabilized fiber dispersed therein was heated to 1000° C. at 5° C./min under circulation of a nitrogen gas in a vacuum gas purging furnace, heat-treated at the same temperature for 0.5 hours, and then cooled to room temperature. Further, the nonwoven fabric was placed in a graphite crucible, and heated in vacuum from room temperature to 2000° C. at 10° C./min using a vacuum ultrahigh-temperature furnace (manufactured by Kurata Giken Co., Ltd., model: SCC-U-80/150, soaking section: 80 mm (diameter)×150 mm (height)). After the temperature reached 2000° C., the atmosphere was turned into an argon gas (99.999%) atmosphere at 0.05 MPa (gauge pressure), the temperature was then elevated to 3000° C. at a temperature elevation rate of 10° C./min, and a heat treatment was performed at 3000° C. for 0.5 hours. An electron micrograph of the resulting ultrafine fibrous carbon is shown in FIG. 5.

The fiber diameter of the ultrafine fibrous carbon obtained by passing through a graphitizing treatment as described above was 150 to 600 nm (average fiber diameter of 280 nm), the ratio (L/D) of the average effective fiber length (L) to the average fiber diameter (D) was 60, and the fibrous carbon had no branch, and was quite excellent in dispersibility. In addition, results of measurement by an X-ray diffraction method showed that the ultrafine fibrous carbon had a lattice spacing (d002) of 0.3370 nm, a crystallite length (La) of 336.3 nm, and a layered planar structure thickness (Lc) of 66.7 nm, and thus the fibrous carbon had high crystallinity. In addition, FIG. 6 shows that the fibrous carbon had a powder volume resistance of 0.14 Ω·cm when packed at a packing density of 0.4 g/cm$^3$, and had high electroconductivity.

An electrode having an electrode mixture layer thickness of 106 μm and an electrode mixture layer density of 2.56 g/cm$^3$ was prepared using 2 parts by mass of the ultrafine fibrous carbon (CNF-2), and 91 parts by mass of a positive active material (LiFePO$_4$: manufactured by Hohsen Corp., S-LFP-ES01) 7 parts by mass of polyvinylidene fluoride (manufactured by KUREHA CORPORATION, W #7200) as a binder. The electrode had a very small volume resistance of 63 Ωcm, and was excellent in electroconductivity.

Example 3

Manufacturing of Ultrafine Fibrous Carbon (CNF-3)

The same mesophase pitch composition as in Example 2 was prepared.

By a melt-spinner, the mesophase pitch composition was then molded into a filament with a fiber diameter of 100 μm using a circular nozzle having a diameter of 0.2 mm and an introduction angle of 60°. The nozzle temperature was 340° C., the discharge amount was 3.8 g/nozzle/hour, the shear rate was 1360 s$^{-1}$, and the draft ratio as a ratio of the discharge linear velocity and the take-up rate was 4. Under the conditions, the extension strain rate inside the nozzle was 982 s$^{-1}$, the deformation range outside the nozzle was 10 mm under the nozzle, and the extension strain rate was 9 s$^{-1}$.

Next, staple fibers having a length of about 5 cm was prepared from the precursor fiber, and disposed in a nonwoven fabric form on a wire gauze having an opening of 1.46 mm and a wire diameter of 0.35 mm in such a manner that the basis weight of the staple fibers was 30 g/m$^2$. Hereinafter, the same procedure as in Example 2 was carried out to obtain an ultrafine fibrous carbon. An electron micrograph of the resulting ultrafine fibrous carbon is shown in FIG. 7.

The fiber diameter of the ultrafine fibrous carbon obtained by passing through a graphitizing treatment as described above was 150 to 700 nm (average fiber diameter of 280 nm), the ratio (L/D) of the average effective fiber length (L) to the average fiber diameter (D) was 60, and the ultrafine fibrous carbon had no branch, and was quite excellent in dispersibility. In addition, the fibrous carbon had a powder volume resistance of 0.14 Ω·cm when packed at a packing density of 0.4 g/cm$^3$. In addition, results of measurement by an X-ray diffraction method showed that the ultrafine fibrous carbon had a lattice surface spacing (d002) of 0.3372 nm, a crystallite length (La) of 110.7 nm, and a layered planar structure thickness (Lc) of 67.5 nm.

An electrode having an electrode mixture layer thickness of 106 μm and an electrode density of 2.56 g/cm$^3$ was prepared using 2 parts by mass of the ultrafine fibrous carbon (CNF-3), and 91 parts by mass of a positive active material (LiFePO$_4$: manufactured by Hohsen Corp., S-LFP-ES01), 7 parts by mass of polyvinylidene fluoride (manufactured by KUREHA CORPORATION, W #7200) as a binder. The electrode had a small volume resistance of 109 Ωcm, and was excellent in electroconductivity.

Comparative Example 1

Except that the graphitization temperature was 2600° C., the same procedure as in Example 1 was carried out to prepare an ultrafine fibrous carbon (CNF-4). The resulting ultrafine fibrous carbon had an average fiber diameter (corresponding to the average length of the smallest dimension) of 250 nm, and had no branched structure. The average effective fiber length was 15.1 μm. In addition, the average lattice spacing d002 of the (002) surface as measured by an X-ray diffraction method was 0.3380 nm, the crystallite length (La110) was 59 nm, and the thickness (Lc002) of a layered planar structure was 48 nm. Thus, the fibrous carbon had low crystallinity.

An electrode having an electrode mixture layer thickness of 115 μm and an electrode density of 2.51 g/cm$^3$ was prepared using 2 parts by mass of the ultrafine fibrous carbon (CNF-4), and 91 parts by mass of a positive active material (LiFePO$_4$: manufactured by Hohsen Corp., S-LFP-ES01), 7 parts by mass of polyvinylidene fluoride (manufactured by KUREHA CORPORATION, W #7200) as a binder. The electrode had a volume resistance of 135 Ωcm, and did not have high electroconductivity.

Cyclic Voltammetry Measurement

A slurry was prepared using 50 parts by mass of an ultrafine fibrous carbon (CNF-4) as a carbon-based electro-conductive aid, 50 parts by mass of polyvinylidene fluoride (manufactured by KUREHA CORPORATION, W #7200W) as a binder, and N-methylpyrrolidone as a solvent. The prepared slurry was applied to a current collector (15 μm-thick aluminum foil), and then dried at 120° C. for 3 hours to prepare a model electrode for cyclic voltammetry measurement. The thickness of an electrode mixture layer formed on the model electrode was 17 μm.

Except that the electrode was used as a working electrode, the same procedure as in Example 1 was carried out to prepare a bipolar cell with a lithium metal as a counter electrode. FIG. 8 shows a CV curve measured in a potential range of 2.5 to 5 V (vs. Li/Li+). This curve shows that the ratio of an integrated value of reduction currents to an integrated value of oxidation currents was 0.84. In addition, FIG. 9 shows a CV curve measured in a potential range of 2.5 to 4.4 V (vs. Li/Li+). FIG. 8 and FIG. 9 show that the ratio of IA/IB was 0. That is, an electrochemical reaction was not generated in a potential range of 2.5 to 4.4 V (vs. Li/Li+).

Charge-Discharge Measurement

Using the bipolar cell, charge-discharge measurement was performed in the same manner as in Example 1. The measurement results are shown in FIG. 10. The results show that the charge capacity was 26.8 mAh/g, the discharge capacity was 17.0 mAh/g, and the charge-discharge efficiency was 63%.

Comparative Example 2

Manufacturing of Fibrous Carbon (MWCNT)

A catalyst containing Fe and Co was placed in a quartz tubular reactor, the inside of the reactor was purged with a nitrogen gas, and the reactor was heated to 690° C. from room temperature over 60 minutes while a nitrogen gas was caused to flow through the reactor. With the temperature kept at 690° C., the nitrogen gas was replaced by a mixed gas A of a nitrogen gas and a hydrogen gas to carry out a reduction reaction. After the reduction reaction, with the temperature kept at 690° C., the mixed gas A was replaced by a mixed gas B of a hydrogen gas and an ethylene gas to carry out a vapor phase growth reaction. The mixed gas B was replaced by a nitrogen gas, the inside of the reactor was purged with the nitrogen gas, and cooled to room temperature.

The resulting ultrafine fibrous carbon had an average fiber diameter (corresponding to the average length of the smallest dimension) of 150 nm, and had a branched structure. The average effective fiber length was 8 μm. In addition, the average lattice spacing d002 of the (002) surface as measured by an X-ray diffraction method was 0.3383 nm, the crystallite length (La110) was 44 nm, and the thickness (Lc002) of a layered planar structure was 28 nm. Thus, the fibrous carbon had low crystallinity. The metal content was 82 ppm (43 ppm for iron and 39 ppm for Si).

An electrode having an electrode mixture layer thickness of 116 μm and an electrode density of 2.54 g/cm³ was prepared using 2 parts by mass of the fibrous carbon (MWCNT), and 91 parts by mass of a positive active material (LiFePO$_4$: manufactured by Hohsen Corp., S-LFP-ES01), 7 parts by mass of polyvinylidene fluoride (manufactured by KUREHA CORPORATION, W #7200) as a binder. The electrode had a volume resistance of 245 Ωcm, and had low electroconductivity.

Cyclic Voltammetry Measurement

A slurry was prepared using 50 parts by mass of a fibrous carbon (MWCNT) as a carbon-based electroconductive aid, 50 parts by mass of polyvinylidene fluoride (manufactured by KUREHA CORPORATION, W #7200W) as a binder, and N-methylpyrrolidone as a solvent. The prepared slurry was applied to a current collector (15 μm-thick aluminum foil), and then dried at 120° C. for 3 hours to prepare a model electrode for cyclic voltammetry measurement. The thickness of an electrode mixture layer formed on the model electrode was 17 μm.

Except that the electrode was used as a working electrode, the same procedure as in Example 1 was carried out to prepare a bipolar cell with a lithium metal as a counter electrode. FIG. 11 shows a CV curve measured in a potential range of 2.5 to 5 V (vs. Li/Li+). This curve shows that the ratio of an integrated value of reduction currents to an integrated value of oxidation currents was 0.81. That is, there can be provided a nonaqueous electrolyte secondary battery in which side reactions such as decomposition of an electrolytic solution and a reaction of an electroconductive aid with the electrolytic solution hardly occur under a high voltage. In addition, FIG. 12 shows a CV curve measured in a potential range of 2.5 to 4.4 V (vs. Li/Li+). FIG. 11 and FIG. 12 show that the ratio of IA/IB was 0.044.

Charge-Discharge Measurement

Using the bipolar cell, charge-discharge measurement was performed in the same manner as in Example 1. The measurement results are shown in FIG. 13. The results show that the charge capacity was 9.1 mAh/g, the discharge capacity was 4.6 mAh/g, and the charge-discharge efficiency was 51%.

Comparative Example 3

An electrode having an electrode mixture layer thickness of 110 μm and an electrode density of 2.54 g/cm³ was prepared using 2 parts by mass of a spherical carbon (AB, the average particle diameter is 35 nm, and this corresponds to the average length of the smallest dimension) and 91 parts by mass of a positive active material (LiFePO$_4$: manufactured by Hohsen Corp., S-LFP-ES01), 7 parts by mass of polyvinylidene fluoride (manufactured by KUREHA CORPORATION, W #7200) as a binder. The electrode had a volume resistance of 851 Ωcm, and had low electroconductivity.

Cyclic Voltammetry Measurement

Except that the electrode was used as a working electrode, the same procedure as in Example 1 was carried out to prepare a bipolar cell with a lithium metal as a counter electrode. FIG. 14 shows a CV curve measured in a potential range of 2.5 to 5 V (vs. Li/Li+). This curve shows that the ratio of an integrated value of reduction currents to an integrated value of oxidation currents was 0.48. In addition, FIG. 15 shows a CV curve measured in a potential range of 2.5 to 4.4 V (vs. Li/Li+). FIG. 14 and FIG. 15 show that the ratio of IA/IB was 0.124.

Charge-Discharge Measurement

Using the bipolar cell, charge-discharge measurement was performed in the same manner as in Example 1. The measurement results are shown in FIG. 16. The results show that the charge capacity was 5.1 mAh/g, the discharge capacity was 1.7 mAh/g, and the charge-discharge efficiency was 33%.

Example 4

90 parts by mass of high-density polyethylene (manufactured by Prime Polymer Co., Ltd., HI-ZEX 5000 SR, melt viscosity: 14 Pa·s at 350° C. and 600 s$^{-1}$, MFR=0.37 g/10 min) as a thermoplastic resin and 10 parts by mass of Mesophase Pitch AR-MPH (manufactured by Mitsubishi Gas Chemical Company, Inc.) as a mesophase pitch were melt-kneaded in a co-rotating twin-screw extruder ("TEM-26SS" manufactured by TOSHIBA MACHINE CO., LTD., at a barrel temperature of 310° C. under a nitrogen gas stream) to prepare a mesophase pitch composition. The dispersion diameter of the mesophase pitch in the thermoplastic resin was 0.05 to 2 μm. In addition, this mesophase pitch composition was held at 300° C. for 10 minutes, but the mesophase pitch was not aggregated, and the dispersion diameter was 0.05 to 2 μm.

The mesophase pitch composition was then molded into a 90 μm-thick planar body using a rectangular nozzle having a slit width of 0.4 mm, a slit length of 100 mm, an introduction angle of 60°, and a distance of 1.7 mm between the start of deformation and the end of deformation. The nozzle temperature was 340° C., the discharge amount was 2.4 kg/hour, the shear rate was 250 s$^{-1}$, the draft ratio as a ratio of the discharge linear velocity and the take-up rate was 40, and the distance between the discharge port and the cooling drum (distance between the start of deformation and the end of deformation outside the nozzle) was 50 mm. Under the conditions, the extension strain rate inside the nozzle was 23 s$^{-1}$, and the extension strain rate outside the nozzle was 267 s$^{-1}$. The resulting planar body was disposed in a nonwoven fabric form on a wire gauze having an opening of 1.46 mm and a wire diameter of 0.35 mm in such a manner that the basis weight was 30 g/m$^2$.

The nonwoven fabric including the resin composite fiber was held in a hot air dryer at 215° C. for 3 hours to prepare a nonwoven fabric including a resin composite stabilized fiber. Next, the nonwoven fabric was placed in a vacuum gas purging furnace, the inside of the furnace was purged with nitrogen, then decompressed to 1 kPa, and heated in this state to remove the thermoplastic resin. As heating conditions, the temperature was elevated to 500° C. at a temperature elevation rate of 5° C./min, and then kept at the same temperature for 60 minutes. Accordingly, a nonwoven fabric-shaped fibrous carbon precursor freed of the thermoplastic resin was obtained. A cross-section sample of the fibrous carbon precursor was prepared, the cross-section was observed with an electron microscope, and an average fiber diameter was determined. The fiber diameter was 200 to 900 nm (average fiber diameter: 400 nm, standard deviation: 120 nm), and a value obtained by dividing the standard deviation of the fiber diameter by the average fiber diameter was 0.30. An electron micrograph is shown in FIG. 17.

Subsequently, the thus-prepared nonwoven fabric-shape fibrous carbon precursor freed of the thermoplastic resin was heated to 1000° C. at 5° C./min under circulation of a nitrogen gas using a vacuum gas purging furnace, heat-treated at the same temperature for 0.5 hours, and then cooled to room temperature. Further, the nonwoven fabric was placed in a graphite crucible, and heated in vacuum from room temperature to 2000° C. at 10° C./min using a vacuum ultrahigh-temperature furnace (manufactured by Kurata Giken Co., Ltd., model: SCC-U-80/150, soaking section: 80 mm (diameter)×150 mm (height)). After the temperature reached 2000° C., the atmosphere was turned into an argon gas (99.999%) atmosphere at 0.05 MPa (gauge pressure), the temperature was then elevated to 3000° C. at a temperature elevation rate of 10° C./min, and a heat treatment was performed at 3000° C. for 0.5 hours to obtain an ultrafine fibrous carbon. The ultrafine fibrous carbon had an average fiber diameter of 250 nm, and the fibrous carbon had no branch, and was quite excellent in dispersibility. The ultrafine fibrous carbon had a lattice spacing (d002) of 0.3370 nm, a crystallite length (La) of 111, and a layered planar structure thickness (Lc) of 66.7 nm, and thus the ultrafine fibrous carbon had high crystallinity. In addition, a value (variation coefficient) obtained by dividing the standard deviation of the fiber diameter by the average fiber diameter was less than 0.50, and thus the variation of the fiber diameter was small.

Example 5

84 parts by mass of high-density polyethylene (manufactured by Prime Polymer Co., Ltd., HI-ZEX 5000 SR, melt viscosity: 14 Pa·s at 350° C. and 600 s$^{-1}$, MFR=0.37 g/10 min) as a thermoplastic resin and 16 parts by mass of Mesophase Pitch AR-MPH (manufactured by Mitsubishi Gas Chemical Company, Inc.) as a mesophase pitch were melt-kneaded in a co-rotating twin-screw extruder ("TEM-26SS" manufactured by TOSHIBA MACHINE CO., LTD., at a barrel temperature of 310° C. under a nitrogen gas stream) to prepare a mesophase pitch composition. The dispersion diameter of the mesophase pitch in the thermoplastic resin was 0.05 to 2 μm. In addition, this mesophase pitch composition was held at 300° C. for 10 minutes, but the mesophase pitch was not aggregated, and the dispersion diameter was 0.05 to 2 μm.

The mesophase pitch composition was then molded into a 90 μm-thick planar body using a rectangular nozzle having a slit width of 0.2 mm, a slit length of 100 mm, an introduction angle of 60°, and a distance of 1.7 mm between the start of deformation and the end of deformation. The nozzle temperature was 340° C., the discharge amount was 2.4 kg/hour, the shear rate was 1000 s$^{-1}$, the draft ratio as a ratio of the discharge linear velocity and the take-up rate was 6, and the distance between the discharge port and the cooling drum was 90 mm. Under the conditions, the extension strain rate inside the nozzle was 95 s$^{-1}$, and the extension strain rate outside the nozzle was 6 s$^{-1}$. Otherwise, the same treatment as in Example 2 was carried out to obtain an ultrafine fibrous carbon. The ultrafine fibrous carbon had an average fiber diameter of 570 nm, and the fibrous carbon had no branch, and was quite excellent in dispersibility. In addition, the ultrafine fibrous carbon had a lattice spacing (d002) of 0.3366 nm, a crystallite length (La) of 113.9 nm, and a layered planar structure thickness (Lc) of 59.1 nm, and thus the fibrous carbon had high crystallinity.

Example 6

The same mesophase pitch composition as in Example 5 was prepared. The mesophase pitch composition was then molded into a 100 μm-thick planar body using a rectangular nozzle having a slit width of 0.2 mm, a slit length of 100 mm, an introduction angle of 60°, and a distance of 1.7 mm between the start of deformation and the end of deformation. The nozzle temperature was 340° C., the discharge amount was 2.4 kg/hour, the shear rate was 1000 s$^{-1}$, the draft ratio as a ratio of the discharge linear velocity and the take-up rate was 6, and the distance between the discharge port and the cooling drum was 50 mm. Under the conditions, the extension strain rate inside the nozzle was 95 s$^{-1}$, and the extension strain rate outside the nozzle was 12 s$^{-1}$. Otherwise, the same treatment as in Example 2 was carried out to obtain an ultrafine fibrous carbon. The ultrafine fibrous carbon had an average fiber diameter of 360 nm, and the fibrous carbon had no branch, and was quite excellent in dispersibility. In addition, the fibrous carbon had a lattice spacing (d002) of 0.3368 nm, a crystallite length (La) of 132.1 nm, and a layered planar structure thickness (Lc) of 52.7 nm, and thus the fibrous carbon had high crystallinity.

Example 7

The same mesophase pitch composition as in Example 5 was prepared. The mesophase pitch composition was then molded into a 140 μm-thick planar body using a rectangular nozzle having a slit width of 0.4 mm, a slit length of 100 mm, an introduction angle of 60°, and a distance of 1.7 mm between the start of deformation and the end of deformation. The nozzle temperature was 340° C., the discharge amount was 4.8 kg/hour, the shear rate was 500 $s^{-1}$, the draft ratio as a ratio of the discharge linear velocity and the take-up rate was 10, and the distance between the discharge port and the cooling drum was 90 mm. Under the conditions, the extension strain rate inside the nozzle was 46 $s^{-1}$, and the extension strain rate outside the nozzle was 18 $s^{-1}$. Otherwise, the same treatment as in Example 2 was carried out to obtain an ultrafine fibrous carbon. The ultrafine fibrous carbon had an average fiber diameter of 600 nm, and the fibrous carbon had no branch, and was quite excellent in dispersibility. In addition, the ultrafine fibrous carbon had a lattice spacing (d002) of 0.3368 nm, a crystallite length (La) of 182.3 nm, and a layered planar structure thickness (Lc) of 61.9 nm, and thus the fibrous carbon had high crystallinity.

Example 8

The same mesophase pitch composition as in Example 5 was prepared. The mesophase pitch composition was then molded into a 130 μm-thick planar body using a rectangular nozzle having a slit width of 0.4 mm, a slit length of 100 mm, an introduction angle of 60°, and a distance of 1.7 mm between the start of deformation and the end of deformation. The nozzle temperature was 340° C., the discharge amount was 4.8 kg/hour, the shear rate was 500 $s^{-1}$, the draft ratio as a ratio of the discharge linear velocity and the take-up rate was 10, and the distance between the discharge port and the cooling drum was 50 mm. Under the conditions, the extension strain rate inside the nozzle was 46 $s^{-1}$, and the extension strain rate outside the nozzle was 33 $s^{-1}$. Otherwise, the same treatment as in Example 2 was carried out to obtain an ultrafine fibrous carbon. The ultrafine fibrous carbon had an average fiber diameter of 420 nm, and the fibrous carbon had no branch, and was quite excellent in dispersibility. In addition, the ultrafine fibrous carbon had a lattice spacing (d002) of 0.3368 nm, a crystallite length (La) of 181.0 nm, and a layered planar structure thickness (Lc) of 53.2 nm, and thus the fibrous carbon had high crystallinity.

Example 9

The same mesophase pitch composition as in Example 5 was prepared. The mesophase pitch composition was then molded into a 50 to 120 μm-thick planar body using a rectangular nozzle having a slit width of 0.8 mm, a slit length of 100 mm, an introduction angle of 60°, and a distance of 1.7 mm between the start of deformation and the end of deformation. The nozzle temperature was 340° C., the discharge amount was 2.4 kg/hour, the shear rate was 63 $s^{-1}$, the draft ratio as a ratio of the discharge linear velocity and the take-up rate was 80, and the distance between the discharge port and the cooling drum was 50 mm. Under the conditions, the extension strain rate inside the nozzle was 5 $s^{-1}$, and the extension strain rate outside the nozzle was 533 $s^{-1}$. Otherwise, the same treatment as in Example 2 was carried out to obtain an ultrafine fibrous carbon. The ultrafine fibrous carbon had an average fiber diameter of 390 nm, and the fibrous carbon had no branch, and was quite excellent in dispersibility. In addition, the ultrafine fibrous carbon had a lattice spacing (d002) of 0.3367 nm, a crystallite length (La) of 148.0 nm, and a layered planar structure thickness (Lc) of 64.3 nm, and thus the fibrous carbon had high crystallinity.

Comparative Example 4

The same mesophase pitch composition as in Example 2 was prepared. By a melt-spinner, the mesophase pitch composition was then molded into a filament with a fiber diameter of 160 μm using a circular nozzle having a diameter of 0.2 mm and an introduction angle of 60°. The nozzle temperature was 340° C., the discharge amount was 4.0 g/nozzle/hour, the shear rate was 1414 $s^{-1}$, and the draft ratio as a ratio of the discharge linear velocity and the take-up rate was 1.6. Under the conditions, the extension strain rate inside the nozzle was 1021 $s^{-1}$, the deformation range outside the nozzle was 10 mm under the nozzle, and the extension strain rate was 2.5 $s^{-1}$. Otherwise, the same treatment as in Example 2 was carried out to obtain an ultrafine fibrous carbon. The ultrafine fibrous carbon had an average fiber diameter of 300 nm, and the fibrous carbon had no branch, and was quite excellent in dispersibility. However, the ultrafine fibrous carbon had a lattice spacing (d002) of 0.3373 nm, a crystallite length (La) of 90.7 nm, and a layered planar structure thickness (Lc) of 47.6 nm, and thus the ultrafine fibrous carbon had low crystallinity.

TABLE 1

| | Shear rate [$s^{-1}$] | Draft ratio | Extension Strain Rate Inside nozzle [$s^{-1}$] | Extension Strain rate outside nozzle [$s^{-1}$] | Average fiber diameter [nm] | L/D | d002 [nm] | La [nm] | Lc [nm] | Powder volume resistance [Ω · cm] | Mixture layer thickness [μm] |
|---|---|---|---|---|---|---|---|---|---|---|---|
| Example 1 | 1360 | 4 | 982 | 9 | 250 | 60 | 0.3372 | 111.0 | 62.0 | — | 114 |
| Example 2 | 1000 | 25 | 95 | 208 | 280 | 60 | 0.3370 | 336.3 | 66.7 | 0.14 | 106 |
| Example 3 | 1360 | 4 | 982 | 9 | 280 | 60 | 0.3372 | 110.7 | 67.5 | 0.14 | 106 |
| Comp. Example 1 | 1360 | 4 | 982 | 9 | 250 | 60 | 0.3380 | 59.0 | 48.0 | — | 115 |
| Comp. Example 2 | — | — | — | — | 150 | 53 | 0.3383 | 44.0 | 28.0 | — | 116 |
| Comp. Example 3 | — | — | — | — | — | 1 | — | — | — | — | 110 |

TABLE 1-continued

| | | | | | | | | | | |
|---|---|---|---|---|---|---|---|---|---|---|
| Example 4 | 250 | 40 | 23 | 267 | 250 | — | 0.3370 | 111.0 | 66.7 | — | — |
| Example 5 | 1000 | 6 | 95 | 6 | 570 | — | 0.3368 | 113.9 | 59.1 | — | — |
| Example 6 | 1000 | 6 | 95 | 12 | 360 | — | 0.3368 | 132.1 | 52.7 | — | — |
| Example 7 | 500 | 10 | 46 | 18 | 600 | — | 0.3368 | 182.3 | 61.9 | — | — |
| Example 8 | 500 | 10 | 46 | 33 | 420 | — | 0.3368 | 181.0 | 53.2 | — | — |
| Example 9 | 63 | 80 | 5 | 533 | 390 | — | 0.3367 | 148.0 | 64.3 | — | — |
| Comp. Example 4 | 1414 | 1.6 | 1021 | 2.5 | 300 | — | 0.3373 | 90.7 | 47.6 | — | — |

| | Electrode density [g/cm3] | Electrode resistance [Ω · cm] | Ratio of Integrated value of reduction currents/ integrated value of oxidation currents | IA/IB | Charge capacity [mAh/g] | Discharge capacity [mAh/g] | Charge-discharge efficiency [%] |
|---|---|---|---|---|---|---|---|
| Example 1 | 2.56 | 83 | 0.9 | 0 | 22.7 | 14.7 | 65 |
| Example 2 | 2.56 | 63 | — | — | — | — | — |
| Example 3 | 2.56 | 109 | — | — | — | — | — |
| Comp. Example 1 | 2.51 | 135 | 0.84 | 0 | 26.8 | 17 | 63 |
| Comp. Example 2 | 2.54 | 245 | 0.81 | 0.044 | 9.1 | 4.6 | 51 |
| Comp. Example 3 | 2.54 | 851 | 0.48 | 0.0124 | 5.1 | 1.7 | 33 |
| Example 4 | — | — | — | — | — | — | — |
| Example 5 | — | — | — | — | — | — | — |
| Example 6 | — | — | — | — | — | — | — |
| Example 7 | — | — | — | — | — | — | — |
| Example 8 | — | — | — | — | — | — | — |
| Example 9 | — | — | — | — | — | — | — |
| Comp. Example 4 | — | — | — | — | — | — | — |

REFERENCE SIGNS LIST

10 Nozzle
11 Deformation start point
13 Deformation end point
15 Slit channel
θ Introduction angle

The invention claimed is:

1. A fibrous carbon having an average effective fiber length (L) of 1 to 100 μm, an average fiber diameter (D) of 100 nm to 1 μm, a ratio (L/D) of the average effective fiber length (L) to the average fiber diameter (D) of the fibrous carbon of 30 or more and 1000 or less, and a crystallite length (La) of 100 to 500 nm and a thickness (Lc) of graphene of 50 to 150 nm as measured by an X-ray diffraction method,
wherein the fibrous carbon has no branching.

2. The fibrous carbon according to claim 1, wherein the fibrous carbon has a boron content of 1 ppm by mass or less.

3. An electrode mixture layer for a nonaqueous electrolyte secondary battery comprising:
an electrode active material; and
a carbon-based electroconductive aid containing the fibrous carbon according to claim 1.

4. The electrode mixture layer for the nonaqueous electrolyte secondary battery according to claim 3, wherein the electrode mixture layer for the nonaqueous electrolyte secondary battery has a thickness of 50 to 5000 μm.

5. The electrode mixture layer for the nonaqueous electrolyte secondary battery according to claim 3, wherein the electrode mixture layer for the nonaqueous electrolyte secondary battery does not generate an electrochemical reaction in which the ratio of an integrated value of reduction currents to an integrated value of oxidation currents is 0.6 or less in a cyclic voltammogram (CV) measured in a range of 2.5 to 5 V (vs. Li/Li+) using an ethylene carbonate/ethyl methyl carbonate mixed solution (volume (25° C.) ratio=3/7) containing $LiPF_6$ in a concentration of 1 mol/L while an electrode including the electrode mixture layer for the nonaqueous electrolyte secondary battery is used as a working electrode, and a lithium metal is used as a counter electrode.

6. The electrode mixture layer for the nonaqueous electrolyte secondary battery according to claim 3, wherein the fibrous carbon is a fibrous carbon that satisfies the following formula (1):

$$IA/IB < 0.02 \quad \text{Formula (1)}$$

(where IA is the highest of current values when the oxidation current takes the maximum value in cyclic voltammogram measurement in a potential range of 2.5 to 4.4 V (vs. Li/Li+), and IB is a current value at 5 V in cyclic voltammogram measurement in a potential range of 2.5 to 5 V (vs. Li/Li+))
in a cyclic voltammogram (CV) measured in a potential range of 2.5 to 4.4 V (vs. Li/Li+) using an ethylene carbonate/ethyl methyl carbonate mixed solution (volume (25° C.) ratio=3/7) containing $LiPF_6$ in a concentration of 1 mol/L while an electrode including 100 parts by mass of an electrode mixture layer for the nonaqueous electrolyte secondary battery which includes 50 parts by mass of the fibrous carbon and 50 parts by mass of polyvinylidene fluoride is used as a working electrode, and a lithium metal is used as a counter electrode.

7. An electrode for a nonaqueous electrolyte secondary battery, wherein the electrode for the nonaqueous electrolyte secondary battery includes a current collector, and the electrode mixture layer for the nonaqueous electrolyte secondary battery according to claim 3 which is laminated on the current collector.

8. A nonaqueous electrolyte secondary battery comprising the electrode for the nonaqueous electrolyte secondary battery according to claim 7.

9. The fibrous carbon according to claim 1, wherein the fibrous carbon has a total content of metal elements of 50 ppm by mass or less, wherein the total content of metal elements means the total content of Li, Na, Ti, Mn, Fe, Ni and Co.

10. The fibrous carbon according to claim 1, wherein Lc is from 62.0 to 150 nm.

11. The fibrous carbon according to claim 1, wherein Lc is from 62.0 to 67.5 nm.

12. The electrode mixture layer for the nonaqueous electrolyte secondary battery according to claim 3, wherein the carbon-based electroconductive aid further contains carbon nanotubes.

\* \* \* \* \*